United States Patent
Xiong et al.

(10) Patent No.: US 11,476,985 B2
(45) Date of Patent: Oct. 18, 2022

(54) CHANNEL STATE INFORMATION REPORT ON PHYSICAL UPLINK SHARED CHANNEL IN NEW RADIO

(71) Applicant: Apple Inc., Cupertino, CA (US)

(72) Inventors: Gang Xiong, Portland, OR (US); Alexei Davydov, Nizhny Novgorod (RU); Seunghee Han, San Jose, CA (US); Yushu Zhang, Beijing (CN); Joonyoung Cho, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/646,188

(22) PCT Filed: Sep. 10, 2018

(86) PCT No.: PCT/CN2018/104860
§ 371 (c)(1),
(2) Date: Mar. 11, 2020

(87) PCT Pub. No.: WO2019/047952
PCT Pub. Date: Mar. 14, 2019

(65) Prior Publication Data
US 2020/0274660 A1    Aug. 27, 2020

Related U.S. Application Data

(60) Provisional application No. 62/570,008, filed on Oct. 9, 2017, provisional application No. 62/556,966, filed on Sep. 11, 2017.

(51) Int. Cl.
*H04W 4/00* (2018.01)
*H04L 5/00* (2006.01)

(52) U.S. Cl.
CPC .......... *H04L 5/0012* (2013.01); *H04L 5/0055* (2013.01); *H04L 5/0057* (2013.01)

(58) Field of Classification Search
CPC ... H04L 5/0012; H04L 5/0055; H04L 5/0057; H04L 1/1671; H04L 1/1854; H04L 5/0007; H04L 5/0091; H04W 72/1268
USPC ........................................................ 370/330
See application file for complete search history.

(56) References Cited

U.S. PATENT DOCUMENTS

| | | | |
|---|---|---|---|
| 8,929,319 B2 * | 1/2015 | Anderson ............ | H04L 5/0037 370/329 |
| 2015/0049698 A1 * | 2/2015 | Liu ...................... | H04L 5/0035 370/329 |

(Continued)

FOREIGN PATENT DOCUMENTS

| | | |
|---|---|---|
| CN | 106992847 A | 7/2017 |
| WO | 2015/021181 A1 | 2/2015 |

(Continued)

OTHER PUBLICATIONS

Nokia et al: "UCI multiplexing on PUSCH", 3GPP Draft; R1-1710899 UCI on PUSCH Final, 3rd Generation Partnership Project T3GPP), Mobile Competence Centre ; 650, Route Des Lucioles ; F-06921 Sophia-Antipolis Cedex, France; vol. RAN WG1, No. Qingdao, P R. China; Jun. 27, 2017-Jun. 30, 2017; Jun. 26, 2017 (Jun. 26, 2017), XP051300100.

(Continued)

*Primary Examiner* — Mang Hang Yeung
(74) *Attorney, Agent, or Firm* — Eschweiler & Potashnik, LLC

(57) ABSTRACT

Methods and apparatuses for channel state information report on physical uplink shared channel in new radio are provided. An apparatus for a user equipment (UE), comprising: a processor, configured to generate a uplink (UL) signal data for a physical uplink shared channel (PUSCH) by using a resource mapping scheme; and a radio frequency (RF) interface, configured to receive the generated UL signal data from the processor, wherein at least a part of the (Continued)

resource mapping scheme is predefined, configured by higher layer signalling, or indicated in downlink control information (DCI).

17 Claims, 20 Drawing Sheets

(56) References Cited

U.S. PATENT DOCUMENTS

| | | | |
|---|---|---|---|
| 2016/0028518 A1* | 1/2016 | Zhao | H04W 74/004 370/330 |
| 2018/0013522 A1* | 1/2018 | Liu | H04L 1/1854 |
| 2018/0110041 A1* | 4/2018 | Bendlin | H04L 5/0051 |
| 2018/0175993 A1* | 6/2018 | Onggosanusi | H04B 7/0486 |
| 2019/0029046 A1 | 1/2019 | Li et al. | |

FOREIGN PATENT DOCUMENTS

| | | |
|---|---|---|
| WO | 2015021181 A1 | 2/2015 |
| WO | 2017/124863 A1 | 7/2017 |

OTHER PUBLICATIONS

CATT: "Multiplexing of UCI and UL data on PUSCH", 3GPP Draft; R1-1712407, 3rd Generation Partnership Project (3GPP), Mobile Competence Centre ; 650, Route Des Lucioles ; F-06921 Sophia-Antipolis Cedex, France; vol. RAN WG1, No. Prague, Czechia; Aug. 21, 2017-Aug 25, 2017; Aug. 20, 2017 (Aug. 20, 2017), XP051315223.

Extended European Search Report dated Apr. 26, 2021 in connection with European Patent Application No. 18854440.7.

International Search Report dated Nov. 30, 2018 for International Application No. PCT/CN2018/104860.

"UCI multiplexing onto PUSCH." Agenda Item: 6.1.3.2.5.1. Source: Intel Corporation. 3GPP TSG RAN WG1 Meeting #90, Prague, P.R. Czechia, Aug. 21-25, 2017. R1-1712584.

"CSI feedback mechanism on PUCCH." Agenda Item: 6.1.2.2.3. Source: ZTE. 3GPP TSG Ran WG1 Meeting #90, Prague, Czech, Aug. 21-25, 2017. R1-1712317.

"UCI multiplexing onto PUSCH 3GPP TSG Ran WG1 Meeting #90", Aug. 21-25, 2017, 15 Pages.

* cited by examiner

CHANNEL STATE INFORMATION REPORT ON PHYSICAL UPLINK SHARED CHANNEL IN NEW RADIO

REFERENCE TO RELATED APPLICATIONS

This application is a National Phase entry application of International Patent Application No. PCT/CN2018/104860 filed Sep. 10, 2018, which claims priority to U.S. Provisional Applications No. 62/556,966 filed on Sep. 11, 2017, entitled "channel state information report on physical uplink shared channel in new radio" and U.S. Provisional Applications No. 62/570,008 filed on Oct. 9, 2017, entitled "channel state information report on physical uplink shared channel in new radio", and are hereby incorporated by reference in its entirety.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes contradictory performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple and seamless wireless connectivity. NR will enable ubiquitous connected by wireless and deliver fast, rich contents and services.

Uplink control information (UCI) is used for providing the scheduler and the hybrid automatic repeat request (HARQ) protocol with information about the condition at UE. Typically it requires more robust performance than data channel.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION OF EMBODIMENTS

Figure 1:
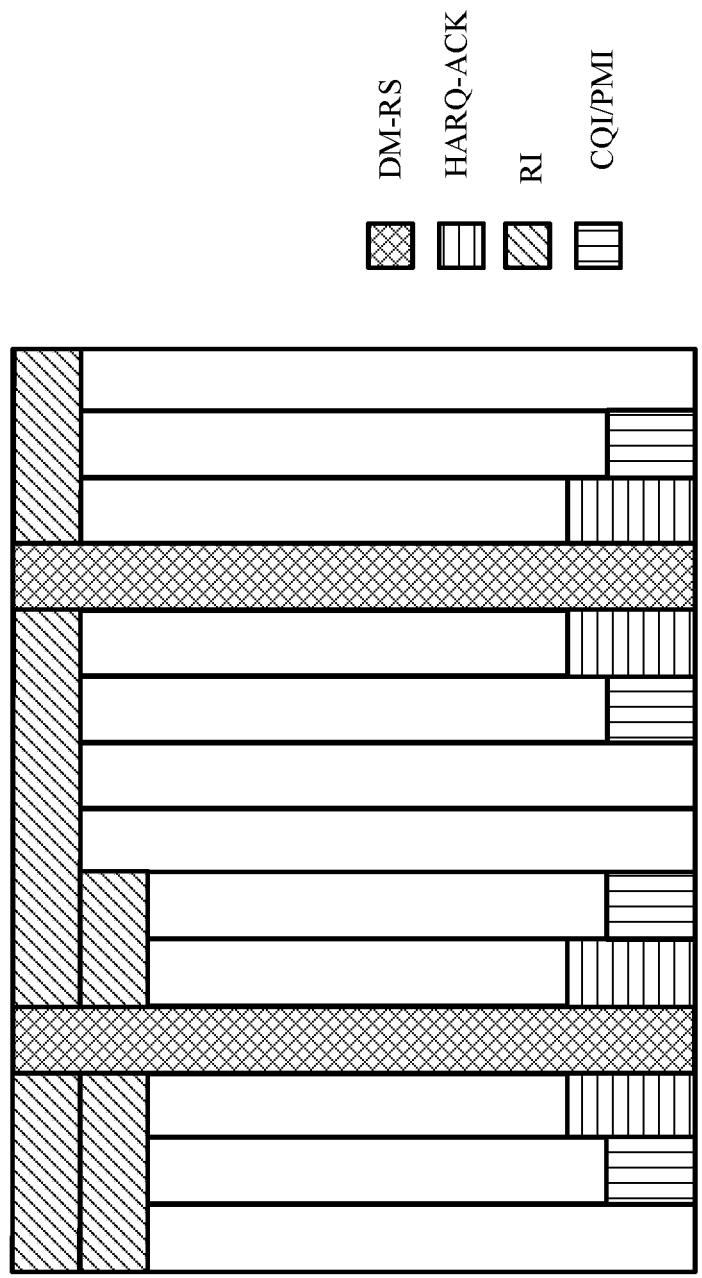
FIG. 1 illustrates the multiplexing scheme for UCI on PUSCH in LTE.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

For NR, uplink control information (UCI) may include scheduling request (SR), hybrid automatic repeat request-acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1-reference signal received power)).

As agreed in NR, UCI on physical uplink shared channel (PUSCH) is supported in addition to simultaneous physical uplink control channel (PUCCH) and PUSCH transmission. In the case when the UCI payload size is large, it may be carried in PUSCH to improve the link budget.

Further, with regard to encoding of CSI parameters for PUSCH-based reporting, for Type I CSI feedback, a CSI report is composed of up to 2 parts wherein the first CSI part includes RI/CRI, CQI for the first codeword (CW) and the second CSI part includes PMI and CQI for the second CW when RI>4. For Type II CSI feedback, a CSI report is composed of up to 2 or 3 parts.

Note that the payload size for the first CSI part may be predetermined, with potential zero padding which may depend on configuration. The payload size for second CSI part may be variable, which may be derived based on the content of the first CSI part.

It was agreed in NR that at least for periodic CSI report configured by RRC and aperiodic CSI report triggered by UL grant, the UL data is rate-matched around the UCI. In this case, if the design principle in LTE is applied to the multiplexing of CSI on PUSCH, the resource allocated to the PUSCH may be calculated according to the resource for the CSI report and total available allocated resource. Given that the resource allocated to the transmission of second CSI part depends on the content of the first CSI part as mentioned above, if the first CSI part is miss detected, gNB (Base Station in NR) may not be able to determine correctly the resource allocated to the transmission of the second CSI part and thus UL data such as uplink (UL) shared channel (UL-SCH), which would lead to decoding failure of the PUSCH. To address this issue, certain mechanism may be defined such that even if gNB misses detecting the first CSI part, gNB may still be able to decode the PUSCH successfully.

FIG. 1 illustrates the multiplexing scheme for UCI on PUSCH in LTE. Note that in order to resolve ambiguity issue between eNB and UE due to miss detection of physical downlink control channel (PDCCH) carrying DL assignment, hybrid automatic repeat request-acknowledgement (HARQ-ACK) feedback is punctured into the encoded data bits. In this case, regardless of the presence of HARQ-ACK feedback, eNB may still be able to decode the uplink transmission from non-punctured data symbols. Further, encoded HARQ-ACK symbols are placed on single-carrier frequency division multiple access (SC-FDMA) symbols adjacent to Demodulation-Reference Signal (DM-RS) position, which may deliver better channel estimation quality and decoding performance. For other uplink control information (UCI) types, rank indicator (RI) is located on the symbols next to HARQ-ACK symbols by employing a similar mapping scheme, while channel quality indicator (CQI) and precoding matrix indicator (PMI) are mapped sequentially to all SC-FDMA symbols in a time first manner using same modulation scheme as data transmission.

Turning now to the embodiments, embodiments disclosed herein may be directed to resource mapping schemes, which is used by user equipment (UE) such as UE 1501 or 1502, for uplink signal on PUSCH.

Figure 2:
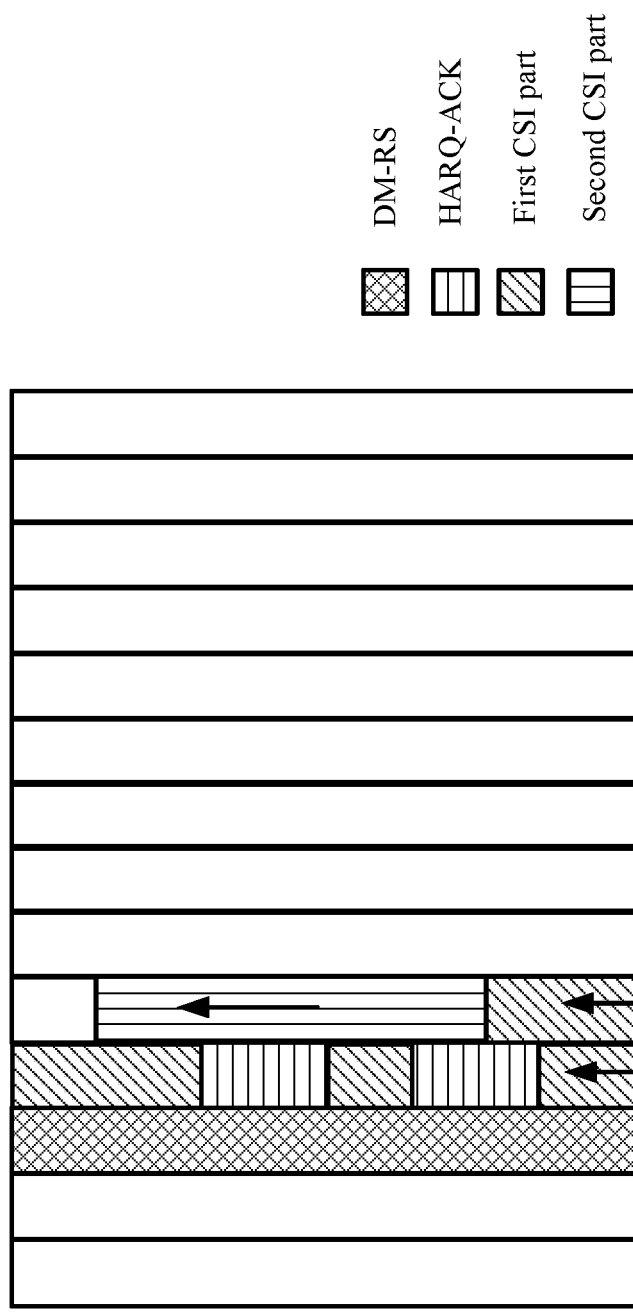
FIG. 2 illustrates frequency first mapping applied to the transmission of the CSI report, in accordance with some embodiments.
Figure 3:
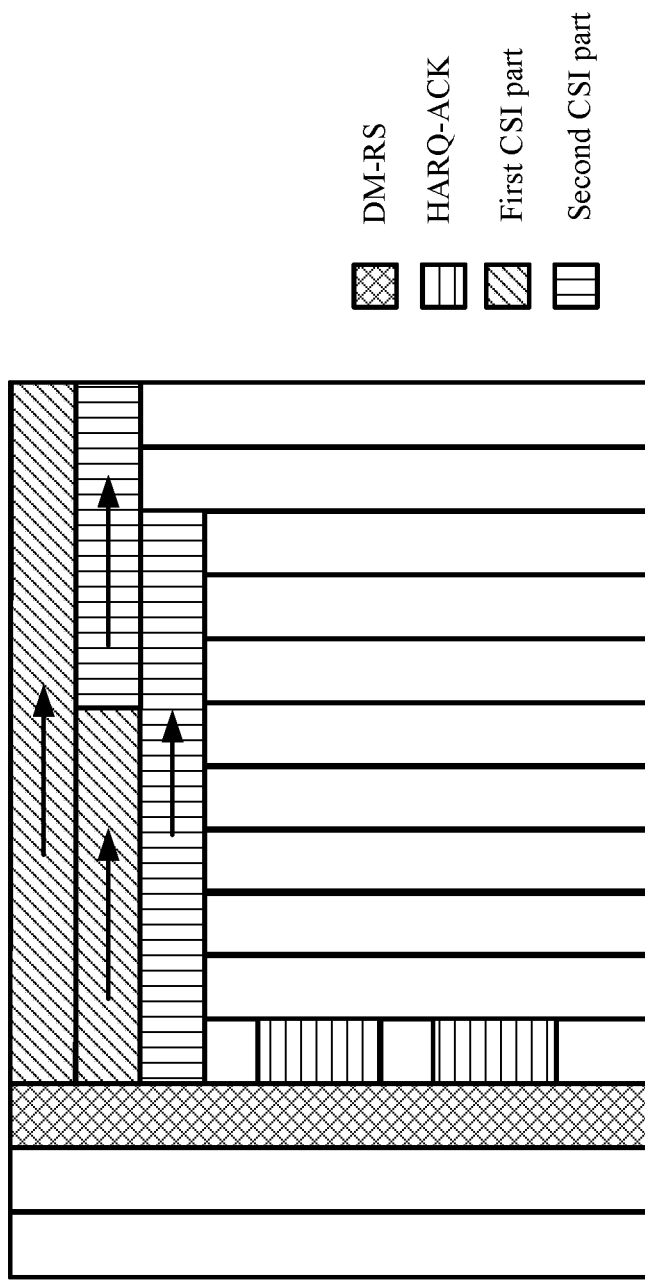
FIG. 3 illustrates time first mapping applied to the transmission of the CSI report, in accordance with some embodiments.

Embodiments of resource mapping schemes for uplink signal on PUSCH may include the following:
Resource mapping schemes for CSI report on PUSCH
Resource mapping schemes for UL data on PUSCH
Resource mapping schemes for HARQ-ACK feedback.
Resource Mapping Schemes for CSI Report on PUSCH
FIG. 2 illustrates frequency first mapping applied to the transmission of the CSI report, in accordance with some embodiments. FIG. 3 illustrates time first mapping applied to the transmission of the CSI report, in accordance with some embodiments.

In embodiments, the same resource mapping manner, either time first mapping shown in FIG. 3 or frequency first mapping shown in FIG. 2, may be applied to the transmission of the first CSI part and the second CSI part.

In either mapping manner, the first CSI part may be mapped to the resource(s) which are not allocated to the HARQ-ACK feedback, then the second CSI part may be mapped to the resource(s) which are not allocated to the HARQ-ACK feedback and the first CSI part.

The amount of the resource allocated to the first CSI part may be determined in accordance with a configured parameter and the modulation order applied to the transmission of the first CSI part.

In an embodiment, the same modulation order may be applied to the transmission of the first and second CSI part, which may be same as that applied to the transmission of UL data in the same layer. Alternatively, to ensure more robust performance for the first CSI part, Quadrature Phase Shift Keying (QPSK) may be applied to the transmission of the first CSI part, while same modulation order is applied to the transmission of second CSI part and UL data in the same layer.

Note that, the resource mapping manner of the first CSI part and the second CSI part may be same as or different than that of the UL data on PUSCH (UL-SCH). In an embodiment, the frequency first mapping manner may be applied to the PUSCH transmission with cyclic prefix orthogonal frequency-division multiplexing (CP-OFDM) waveform. In this embodiment, the frequency first resource mapping manner may also be applied to the transmission of the first CSI part and second CSI part.

In another embodiment, if time first mapping manner is applied to the PUSCH transmission with discrete Fourier transform spread OFDM (DFT-s-OFDM) waveform, the time first resource mapping manner may also be applied to the transmission of the first CSI part and second CSI part.

In the embodiments shown in FIG. 2 and FIG. 3, HARQ-ACK is either puncturing or rate-matching around the CSI report, depending on the payload size. Further, the first CSI part, the second CSI part, and the UL data may be mapped subsequently, in either time first or frequency first manner.

Note that, although for frequency first mapping as shown in FIG. 2, the mapping starts from the first subcarrier of the allocated resource, the mapping may also start from the last subcarrier of the allocated resource. Similarly, although for time first mapping as shown in FIG. 3, the mapping may start from the first symbol of the allocated resource, the mapping may also start from the last symbol of the allocated resource.

In embodiments, whether to employ time or frequency first mapping may be configured by higher layers via NR minimum system information (MSI), NR remaining minimum system information (RMSI), NR other system information (OSI) or radio resource control (RRC) signaling, or dynamically indicated in the DCI, or a combination thereof. The DCI may be indicated by the network node (e.g., gNB) in communication with the UE. Here, the terminology "higher layers signalling" which is widely used in 3GPP/RAN1 indicates radio resource control (RRC) signalling.

Figure 4:
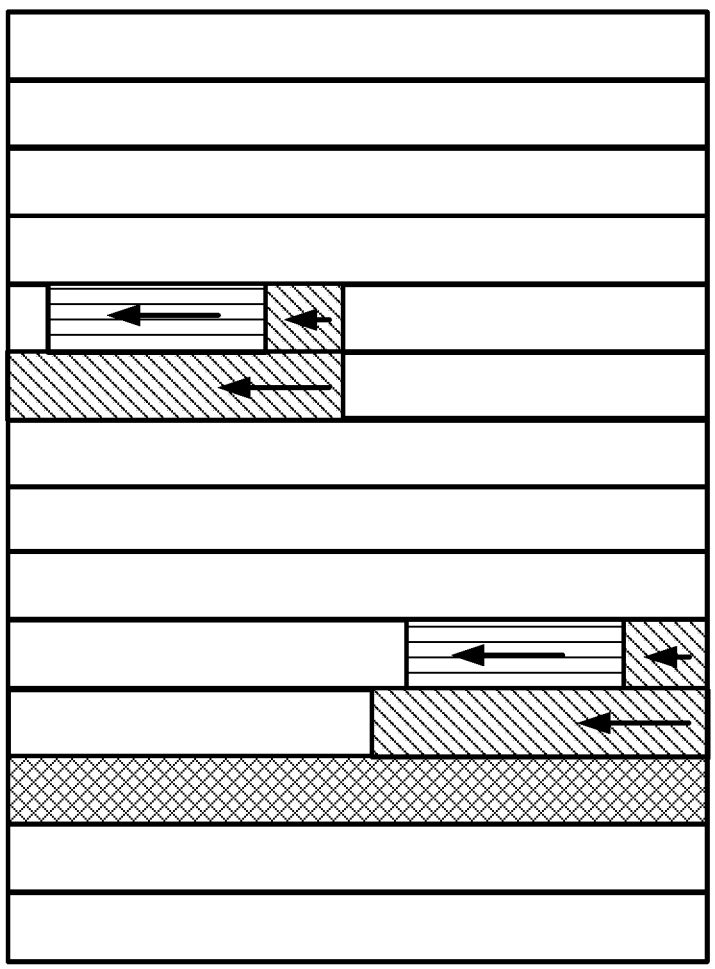
FIG. 4 illustrates hybrid resource mapping scheme with frequency first mapping manner for the transmission of the CSI report on PUSCH, in accordance with some embodiments.
Figure 5:
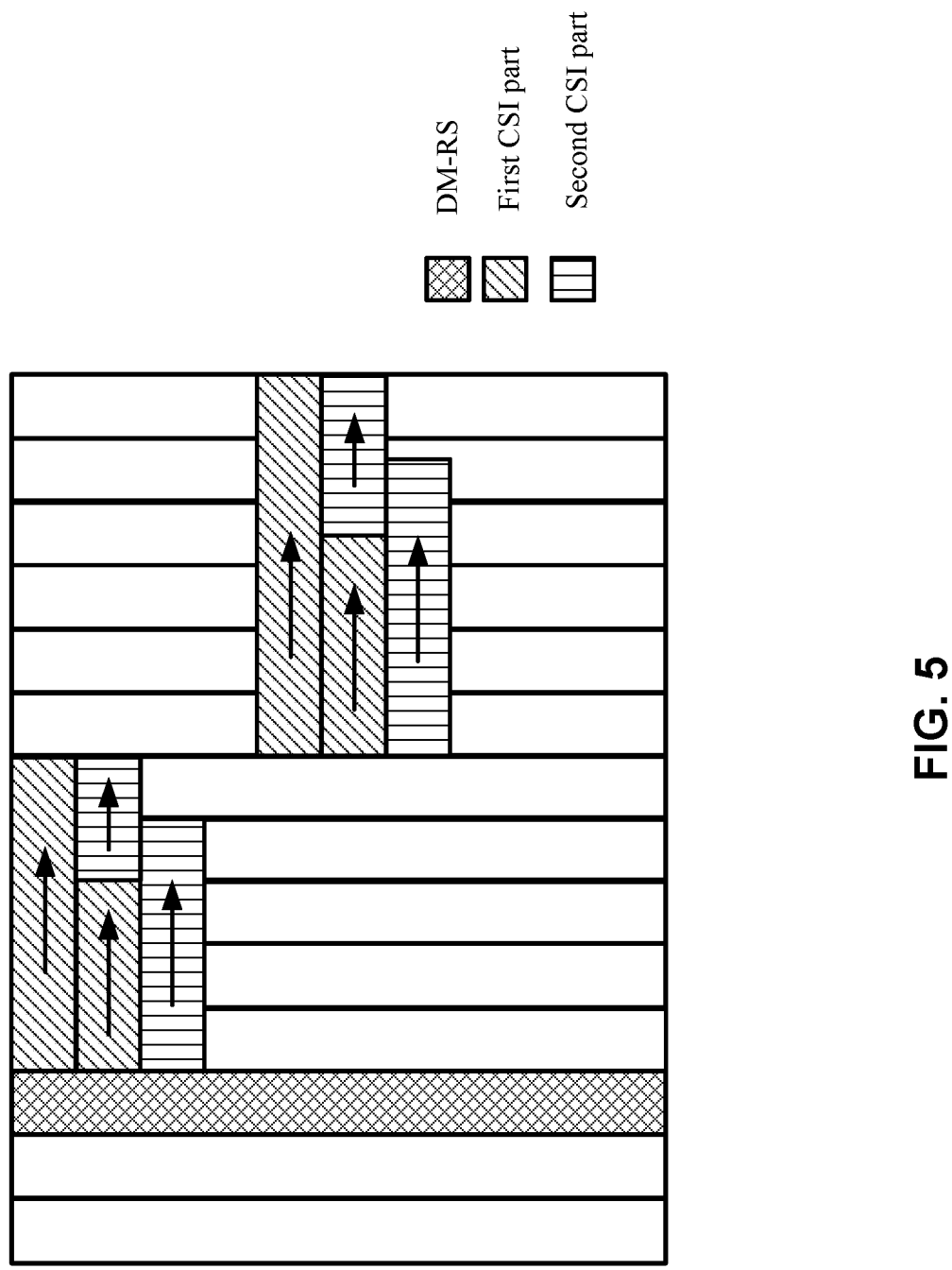
FIG. 5 illustrates hybrid resource mapping scheme with time first mapping manner for the transmission of the CSI report on PUSCH, in accordance with some embodiments.
Figure 6:
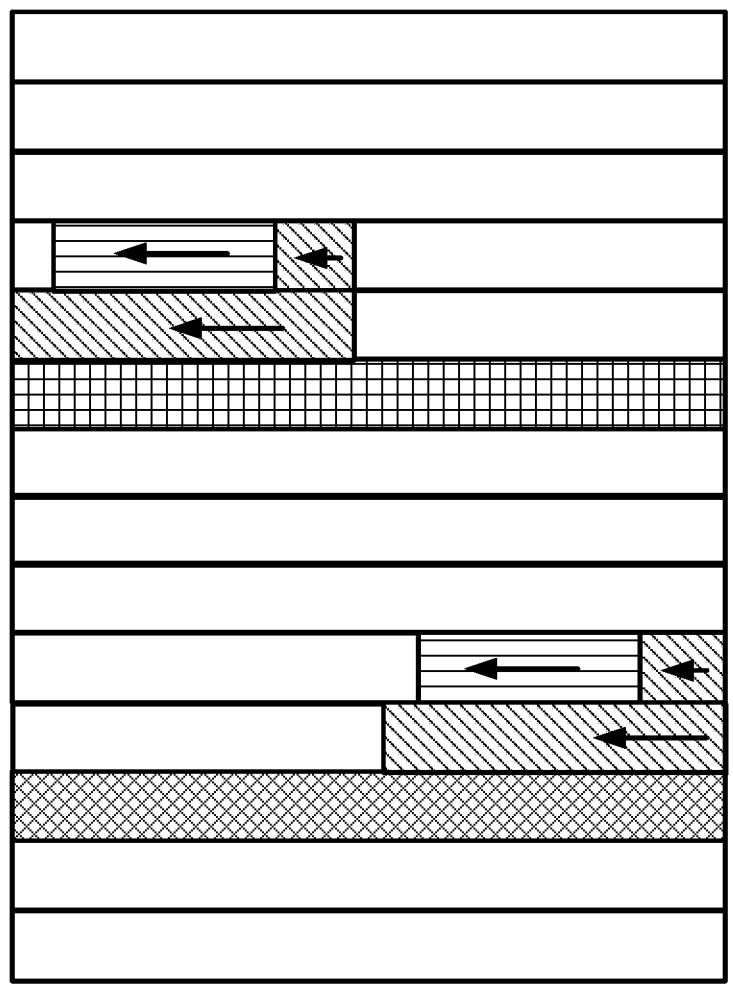
FIG. 6 illustrates hybrid resource mapping scheme where the allocated second resource region starts from the first symbol after the additional DM-RS symbol, in accordance with some embodiments.

FIG. 4 illustrates hybrid resource mapping scheme with frequency first mapping manner for the transmission of CSI report on PUSCH, in accordance with some embodiments. FIG. 5 illustrates hybrid resource mapping scheme with time first mapping manner for the transmission of CSI report on PUSCH, in accordance with some embodiments. FIG. 6 illustrates hybrid resource mapping scheme where the allocated second resource region starts from the first symbol after the additional DM-RS symbol, in accordance with some embodiments.

As shown in FIG. 4-6, in embodiments, a hybrid resource mapping may be employed for the transmission of the first and second CSI part on PUSCH, which may help in exploiting the benefit of both time and frequency diversity. Further, this may help to provide efficient processing of the decoding of CSI report.

In embodiments, one or more resource regions may be allocated to the transmission of the first and second CSI part. In the case when a plurality of resource regions are allocated, the first CSI part may be mapped firstly in each allocated resource region, then the second CSI part. Further, same mapping manner, either time or frequency first mapping, may be applied to the transmission of the first and second CSI part in one or more allocated resource regions. In addition, whether to allocate additional resource region(s) for the first and second CSI part and/or the HARQ-ACK feedback may be configured by higher layers.

In one or more allocated resource regions, the starting position for the transmission of the first and second CSI part in time domain (in term of symbol) and frequency domain (in term of subcarrier or physical resource block (PRB)), may be predefined in the specification or configured by higher layers via MSI, RMSI, OSI, or RRC signaling. Alternatively, in one or more allocated resource regions, the starting position for the transmission of the first and second CSI part may be determined in accordance with the allocated resource for PUSCH.

In an embodiment, as shown in FIG. 4 or 5, two resource regions may be allocated to the transmission of the first and second CSI part, where the first resource region may start from the first symbol after the first Demodulation reference signal (DM-RS), while the second resource region may start from the middle of the allocated PUSCH duration in time domain and/or the middle of subcarrier or PRB of the allocated PUSCH resource in frequency domain. Both time and frequency diversity may be exploited for the transmission of the CSI report on PUSCH.

In another embodiment, as shown in FIG. 6, the second resource region may start from the first symbol after the additional DM-RS symbol. In this embodiment, better channel estimation performance may be expected for the transmission of CSI report on the second resource region.

Resource Mapping Schemes for UL Data on PUSCH

Figure 7:
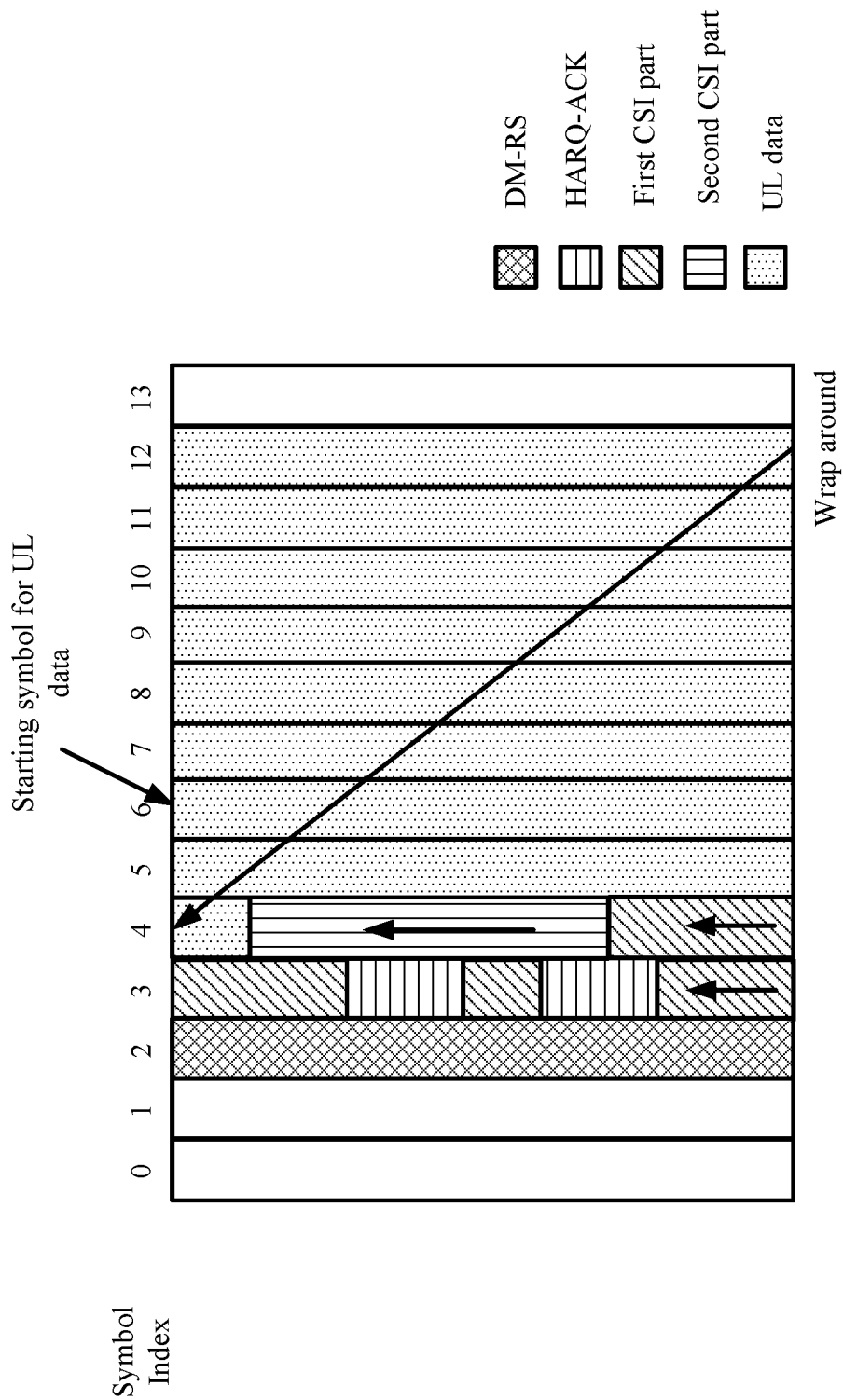
FIG. 7 illustrates resource mapping scheme for UL data during PUSCH transmission, in accordance with some embodiments.

FIG. 7 illustrates resource mapping scheme for UL data during PUSCH transmission, in accordance with some embodiments.

UL data, also referred as uplink shared channel (UL-SCH), is one of the key components that the resource may be allocated for besides the first and second parts of CSI report illustrated above and HARQ-ACK feedback to be illustrated later.

As mentioned above, in LTE the previous approach to allocate resource for the PUSCH transmission depends on the resource for the CSI report and the total available allocated resource, such that the resource allocated for the transmission of the second CSI part is calculated according to the content of the first CSI part. However, if the first CSI part is miss detected, a network node (e.g. gNB) may not be able to determine correctly the resource allocated for the transmission of the second CSI part and thus UL data, which might lead to decoding failure of the PUSCH. Therefore, embodiments are to find other approaches to allocate resource for UL data by determining the starting position for the UL data transmission in advance without gaining any information regarding the second CSI part.

In an embodiment, the starting position of the UL data transmission on PUSCH when UCI is multiplexed on PUSCH, in term of symbol index in time domain and subcarrier or physical resource block (PRB) index in frequency domain, can be predefined in the specification or configured by higher layers via MSI, RMSI, OSI or RRC signaling or dynamically indicated in the DCI or a combination thereof. Alternatively, the starting position of UL data transmission on PUSCH can be determined in accordance with the maximum payload size or offset parameter for the first and second CSI part. In the case when allocated resources for CSI report are not fully occupied, the UL data is wrapped around in form of resource and transmitted in the remaining resource within the allocated resources for the CSI report.

As shown in FIG. 7, one example of the configured starting symbol of UL data on PUSCH in term of frequency first mapping scheme. In this example, assuming the starting symbol of UL data is predefined to be symbol #6. Furthermore, symbol #4 with residual resource and its subsequent symbol #5 are not occupied for the CSI report transmission. In order to use up the resource for all of the remaining symbol including symbol #4 and #5, the resource allocated for UL data is configured to start from symbol #6 to #7 and then all the way to #12, and at the end of the symbol to be wrapped around from #12 to #4 and #5.

In one alternative, in the case of frequency first mapping for PUSCH, the staring symbol of UL data on PUSCH can be configured by higher layers or determined in accordance with the maximum payload size of the CSI report. In another alternative, in the case of time first mapping for PUSCH, the starting subcarrier or PRB of UL data on PUSCH can be configured by higher layer or determined in accordance with the maximum payload size of the CSI report.

In another embodiment, the resource allocated for the UL data transmission is mapped subsequently to the resource allocated for the first CSI part and the second CSI part. The mapping order for each resource region is the same as the embodiment described in FIG. 7, i.e. the HARQ-ACK, the first CSI part, the second CSI part and the UL data.

Figure 8:
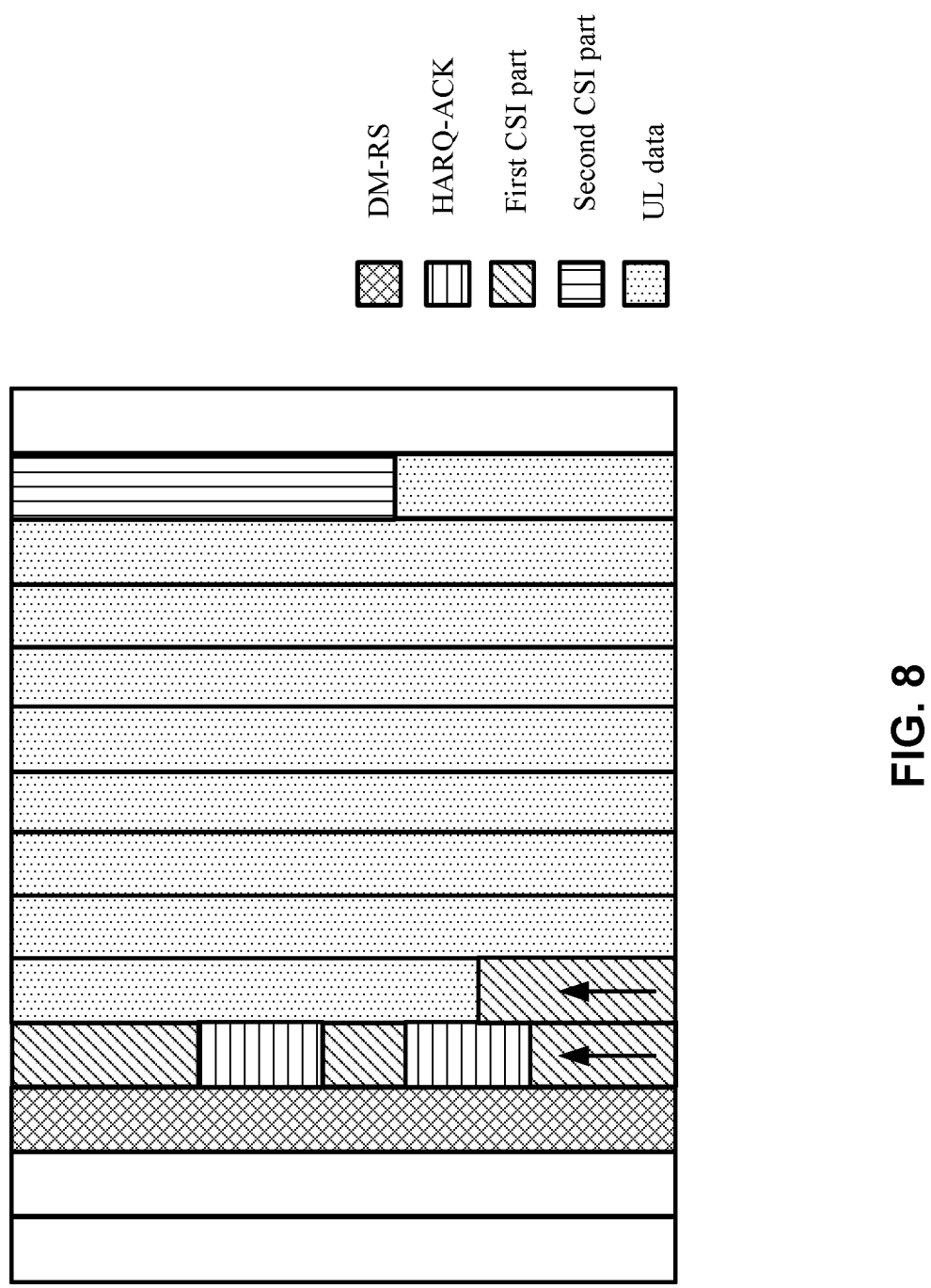
FIG. 8 illustrates resource mapping scheme for UL data during PUSCH transmission, in accordance with some embodiments.

FIG. 8 illustrates resource mapping scheme for UL data during PUSCH transmission, in accordance with some embodiments.

As shown in FIG. 8, another example of UL data resource mapping where the resource allocated for the UL data transmission is mapped subsequently to the resource allocated for the first CSI part and followed by the resources allocated for the second CSI part. That is to say, the mapping order for each resource region is the HARQ-ACK, the first CSI part, the UL data and the second CSI part.

In an embodiment, as illustrated in FIG. 8, UL data is mapped after the first CSI part and the second part is mapped after the UL data. Given that the payload size of the first CSI part can be predetermined according to the CSI configuration, and the resource allocated for the first CSI part can be further determined in accordance with configured offset parameter, thus the starting position of UL data can be determined accordingly, which results in avoiding misalignment between the network node and the UE for decoding the UL data.

Figure 9:
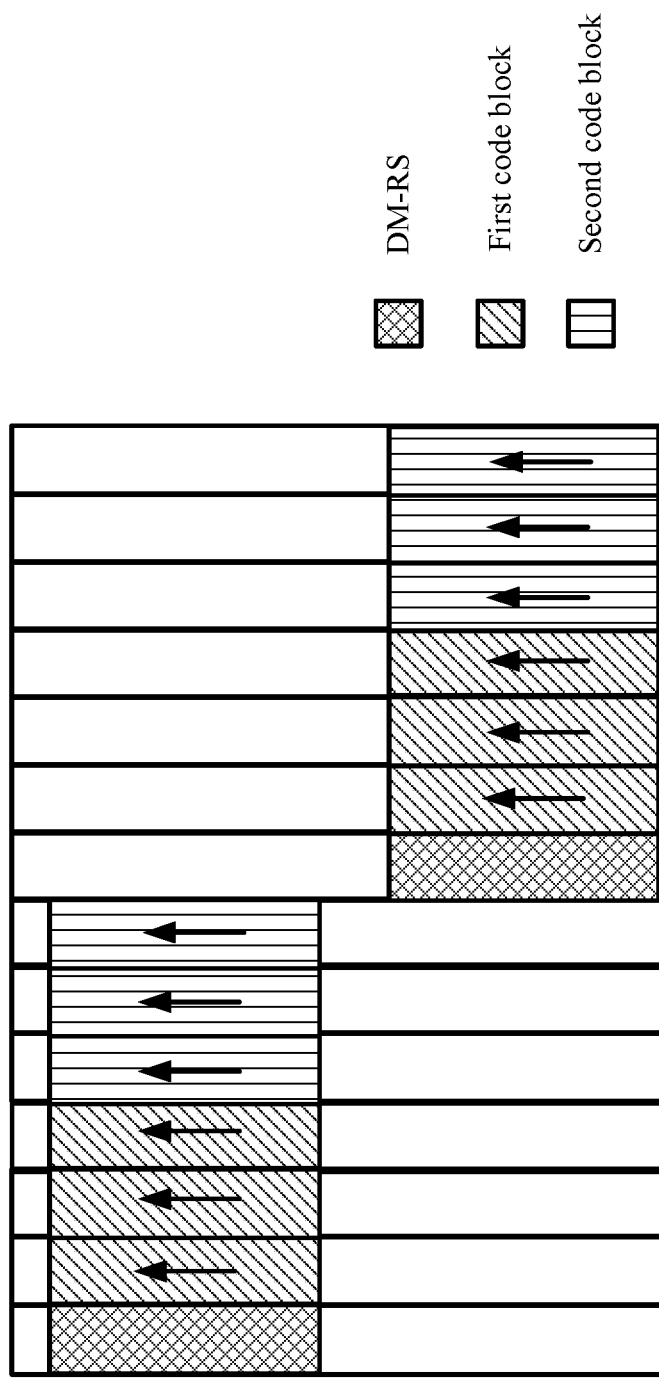
FIG. 9 illustrates mapping scheme of frequency hopping for PUSCH transmission, in accordance with some embodiments.

FIG. 9 illustrates mapping scheme of frequency hopping for PUSCH transmission, in accordance with some embodiments. This scheme may be used as a variation of hybrid resource mapping scheme as illustrated in FIGS. 4 and 5.

The UCI information bits, e.g. HARQ-ACK and/or CSI report etc., may be divided into substantially equal parts and transmitted in each frequency hop in which the mechanism employs frequency first mapping for the transmission of PUSCH.

In an embodiment, same mechanism can be employed for UCI on PUSCH. In particular, UCI including HARQ-ACK feedback, and/or the first and/or second CSI part can be divided into two parts, where each part is transmitted in each frequency hop. This can be equally split into N/2 for the each part, where N is the even number of bits or allocated resources in terms of resource elements (REs) for the UCI, or can be split into floor(N/2) or ceil(N/2) for the first part, and ceil(N/2) or floor(N/2) for the second part where N is the odd number. The aforementioned resource mapping can be employed in each frequency hop. For instance, for each frequency hop, UL data is mapped after the first CSI part, and the second part is mapped after the UL data.

Resource Mapping Schemes for HARQ-ACK on PUSCH

Figure 10:
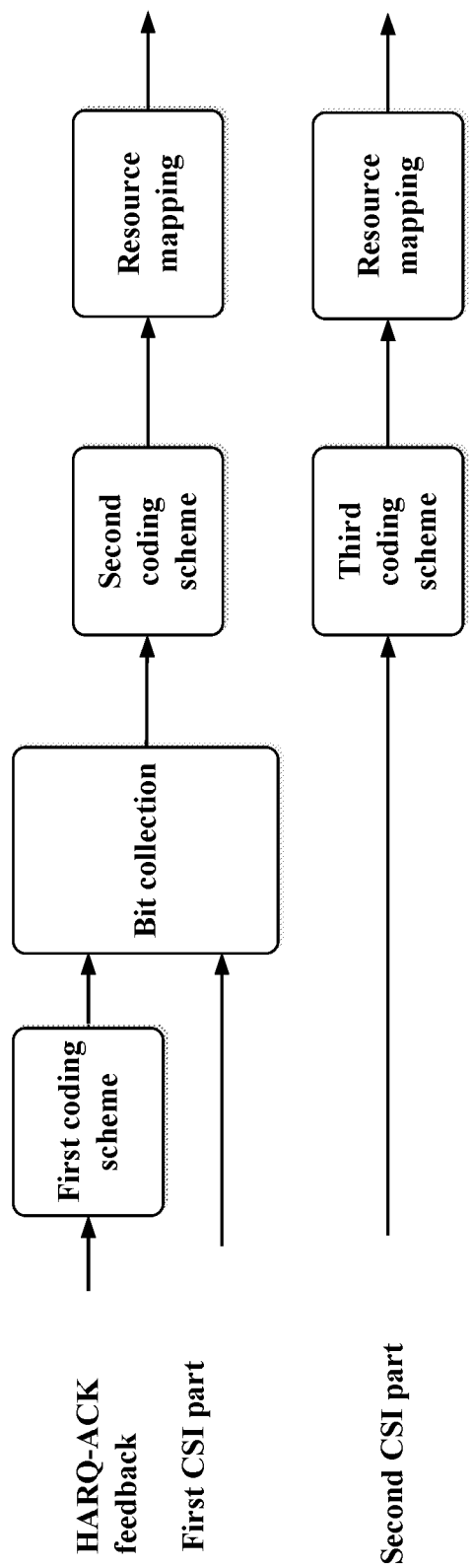
FIG. 10 illustrates joint coding of the HARQ-ACK feedback and the first CSI part, in accordance with some embodiments.

FIG. 10 illustrates joint coding of the HARQ-ACK feedback and the first CSI part, in accordance with some embodiments.

Regarding the transmission of the HARQ-ACK feedback on PUSCH, in NR, for slot-based scheduling, PUSCH is rate-matched if the HARQ-ACK feedback is more than 2 bits, and PUSCH is punctured, if the HARQ-ACK feedback is less than or equal to 2 bits.

In embodiments, as shown in FIG. 10, in the case when payload size of the HARQ-ACK feedback is larger than 2 bits, a joint coding may be applied to the HARQ-ACK feedback and the first CSI part. In order to ensure more robust performance for HARQ-ACK, which may be critical to the system operation, additional encoding procedure may be applied to the HARQ-ACK prior to joint coding with the first CSI part.

Based on the coding scheme shown in FIG. 10, the aforementioned resource mapping scheme for the first CSI part may be straightforwardly applied to the resource mapping for the joint encoded HARQ-ACK feedback with more than 2 bits and first CSI part.

Figure 11:
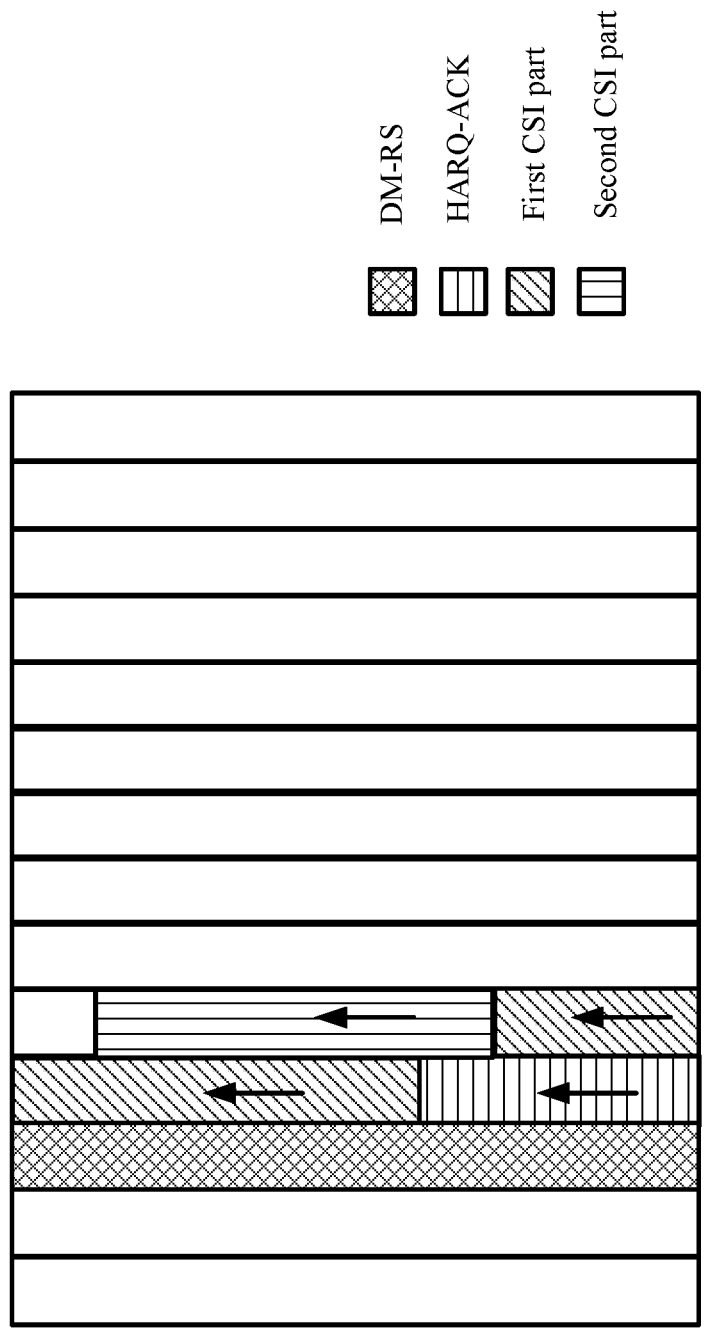
FIG. 11 illustrates resource mapping scheme for the HARQ-ACK feedback, in accordance with some embodiments.

FIG. 11 illustrates resource mapping scheme for the HARQ-ACK feedback, in accordance with some embodiments.

In embodiments, separate coding and resource mapping procedures may be applied to the transmission of the HARQ-ACK feedback and the first CSI part. In an embodiment, same resource mapping manner, either time first or frequency first mapping manner may be applied to the transmission of the HARQ-ACK feedback with more than 2 bits, the first CSI part and the second CSI part. Further, the HARQ-ACK feedback, the first CSI part, the second CSI part and the UL data may be mapped in the order of the HARQ-ACK feedback, the first CSI part, the second CSI part and the UL data, or in the order of the HARQ-ACK feedback, the first CSI part, the UL data or the second CSI part. The HARQ-ACK feedback may be mapped in the allocated resource, which is determined in accordance with a configured offset value.

In the embodiment as shown in FIG. 11, frequency first mapping is applied to the HARQ-ACK with more than 2 bits, the first CSI part, and the second CSI part.

In embodiments, depending on the timeline of HARQ-ACK feedback, the starting symbol for the transmission of HARQ-ACK may be K symbols after the first symbol of the DM-RS. The value K may be configured by higher layers via MSI, RMSI, OSI or RRC signalling, or dynamically indicated in the DCI, or a combination thereof. Alternatively, the starting symbol for the transmission of HARQ-ACK may be determined in accordance with the HARQ-ACK delay as indicated in the DCI. The DCI may be indicated by the network node (e.g., gNB) in communication with the UE.

In the case of late DL assignment after UL grant, HARQ-ACK feedback may puncture the UL data. In this case, starting symbol for HARQ-ACK feedback puncturing is determined in accordance with the HARQ-ACK delay as indicated in the DCI for scheduling PDSCH. Depending on the HARQ-ACK delay, HARQ-ACK feedback may not be transmitted right after the DM-RS.

Note that, the above described resource mapping scheme may be straightforwardly applied to the mini-slot or non-slot based scheduling. Further, for Type II CSI report, the above described resource mapping scheme may be straightforwardly applied to the case when a CSI report is composed of three CSI parts.

Figure 12:
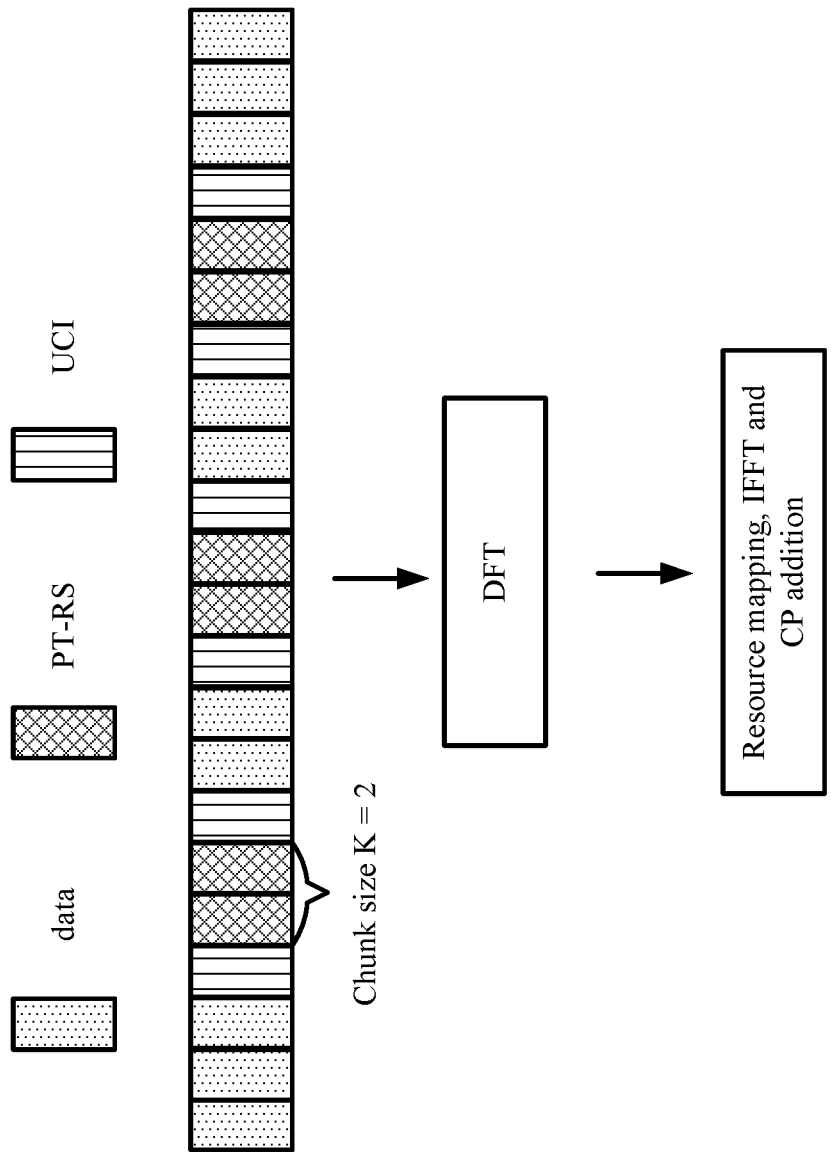
FIG. 12 illustrates resource mapping scheme when Phase Tracking Reference Signal (PT-RS) is used, in accordance with some embodiments.

FIG. 12 illustrates resource mapping scheme when Phase Tracking Reference Signal (PT-RS) is used, in accordance with some embodiments.

In embodiments, if the PT-RS is used for DFT-s-OFDM waveform, the UCI including the HARQ-ACK and the CSI may be mapped around the PT-RS as shown in FIG. 12, where the priority order of the UCI is the HARQ-ACK, the first CSI part and the second CSI part. The UCI with highest priority may be mapped to the resource which is most closed to the PT-RS.

Note that, the above embodiments of resource mapping schemes as shown in FIGS. 2-12 and description related to FIG. 2-12 are only examples, person skilled in the art can made any variation(s) and combination(s) thereof after reading and understanding the concepts in the embodiments.

Figure 13:
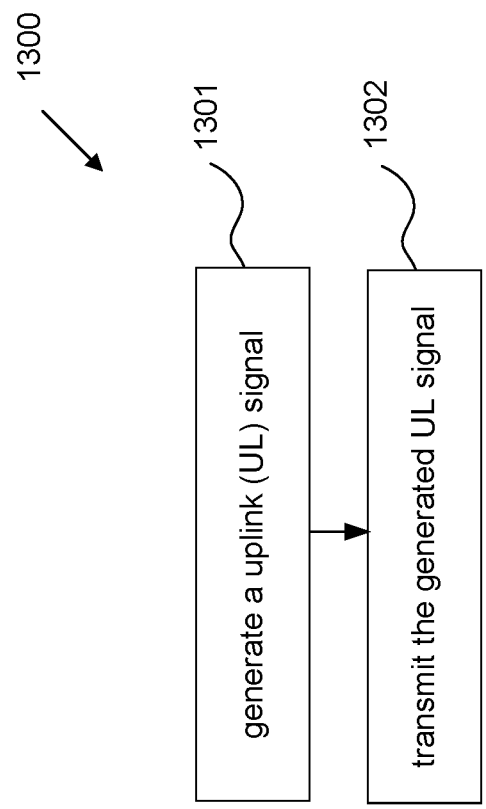
FIG. 13 illustrates flow chart showing an example method for operating an example UE, in accordance with some embodiments.

FIG. 13 illustrates flow chart showing an example method for operating an example UE, in accordance with some embodiments. In an embodiment, the flow chart in FIG. 13 may be implemented in the UE 1501 or 1502 in FIG. 15.

The method 1300 may begin with step 1301, in which the processor or processing circuit of UE, such as UE 1501 or 1502, may generate a uplink (UL) signal to be transmitted on physical uplink shared channel (PUSCH) by using a resource mapping scheme, wherein at least a part of the resource mapping scheme is predefined, configured by higher layer signalling, or indicated in downlink control information (DCI).

In an embodiment, the processor or processing circuit of UE, such as UE 1501 or 1502, may use the resource mapping scheme as shown in FIGS. 2-12 and the above description related to FIG. 2-12.

Then, the method 1300 may proceed to step 1302, in which the transceiver interface of UE, such as UE 1501 or 1502, may transmit the generated UL signal.

The above steps are only examples, and the UE, such as UE 1501 or 1502 may perform any actions described in connection to FIG. 2-12, to generate and transmit the UL signal including the HARQ-ACK feedback, the first CSI part, the second CSI part, and/or UL data on physical uplink shared channel in new radio.

Figure 14:
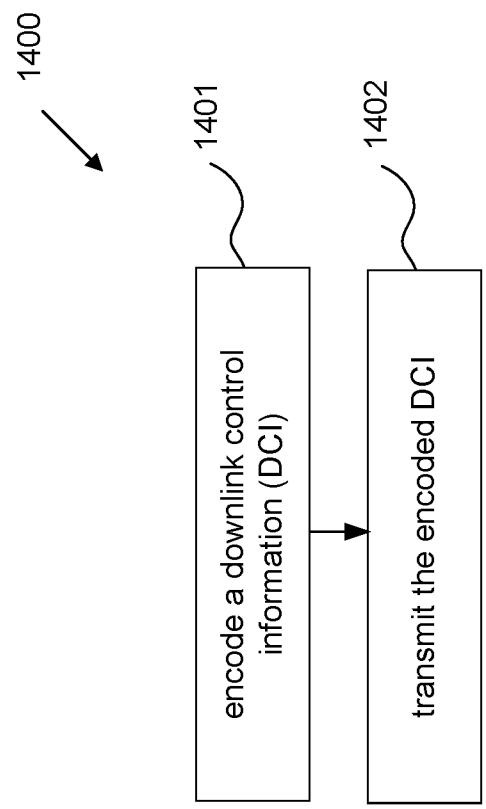
FIG. 14 illustrates flow chart showing an example method for operating an example network node, in accordance with some embodiments.

FIG. 14 illustrates flow chart showing an example method for operating an example network node, in accordance with some embodiments. In an embodiment, the flow chart in FIG. 14 may be implemented in the RAN nodes 1511 and 1512 in FIG. 15 or any other network node.

The method 1400 may begin with step 1401, in which the processor or processing circuit of the RAN node, such as the RAN nodes 1511 and 1512, may encode information, such as downlink control information (DCI), wherein the DCI indicates a resource mapping scheme. The resource mapping scheme may be used by the UE such as UE 1501 or 1502, to generate an uplink (UL) signal to be transmitted on physical uplink shared channel (PUSCH).

Then, the method 1400 may proceed to step 1402, in which the transceiver interface of the RAN node, such as the RAN nodes 1511 and 1512, may transmit the encoded information such as DCI to the UE such as UE 1501 or 1502.

In an embodiment, the processor or processing circuit of UE, such as UE 1501 or 1502, may use the resource mapping scheme as shown in FIGS. 2-12 and the above description related to FIG. 2-12, in response of receiving the information such as DCI from the RAN node, such as the RAN nodes 1511 and 1512.

The above steps are only examples, and the RAN node, such as the RAN nodes 1511 and 1512 or any other network node may perform any actions described in connection to FIG. 2-12, to facilitate to generate and transmit the UL signal including the HARQ-ACK feedback, the first CSI part, the second CSI part, and/or UL data on physical uplink shared channel in new radio.

Figure 20:
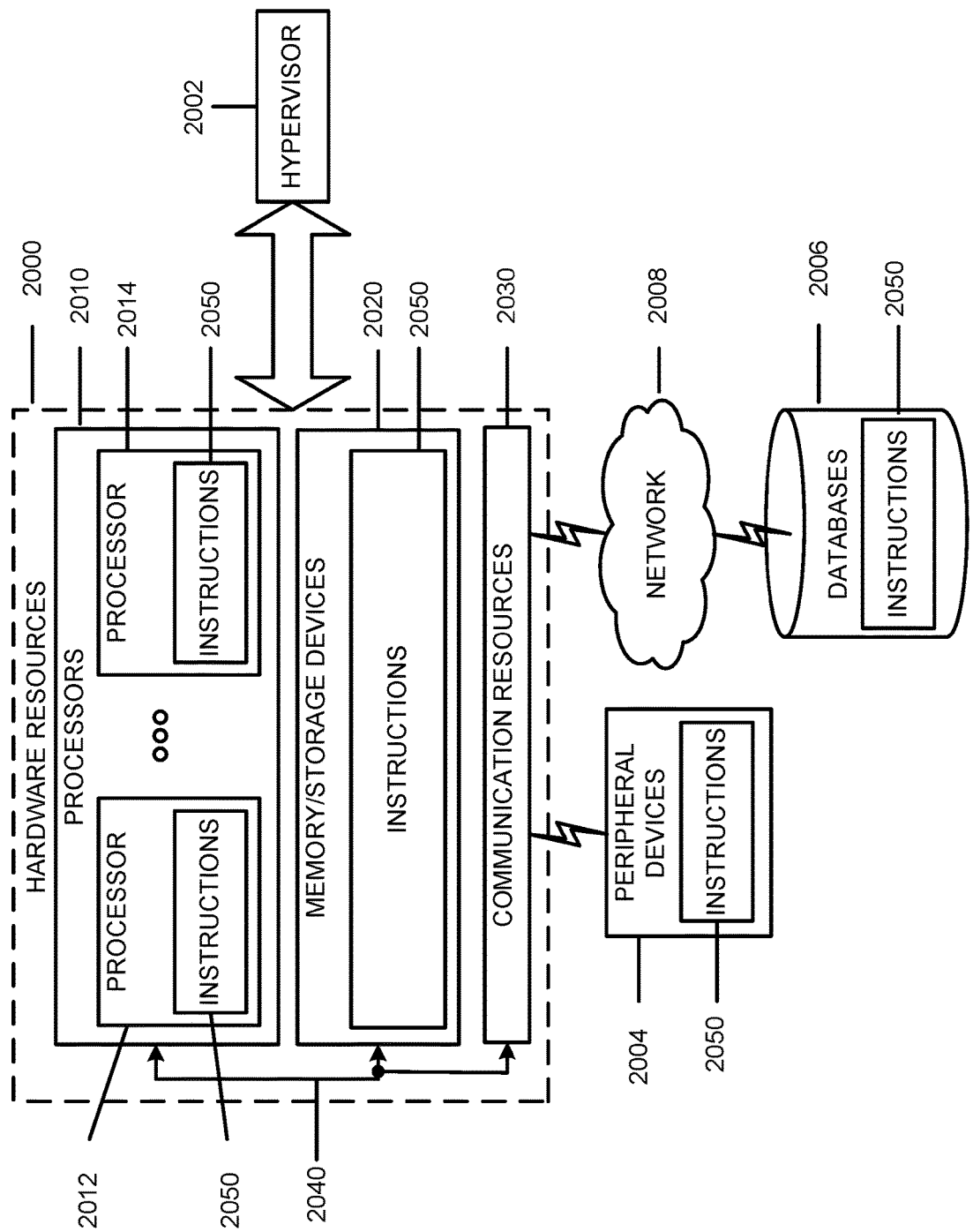
FIG. 20 is a block diagram illustrating components, according to some example embodiments, which are able to read instructions from a machine-readable or computer-readable medium (e.g., a non-transitory machine-readable storage medium) and perform any one or more of the methodologies discussed herein.

Note that, the above procedure in method 1300 and 1400 also may be implemented as computer readable instruction/medium, such as the instructions 2050 in FIG. 20.

Figure 15:
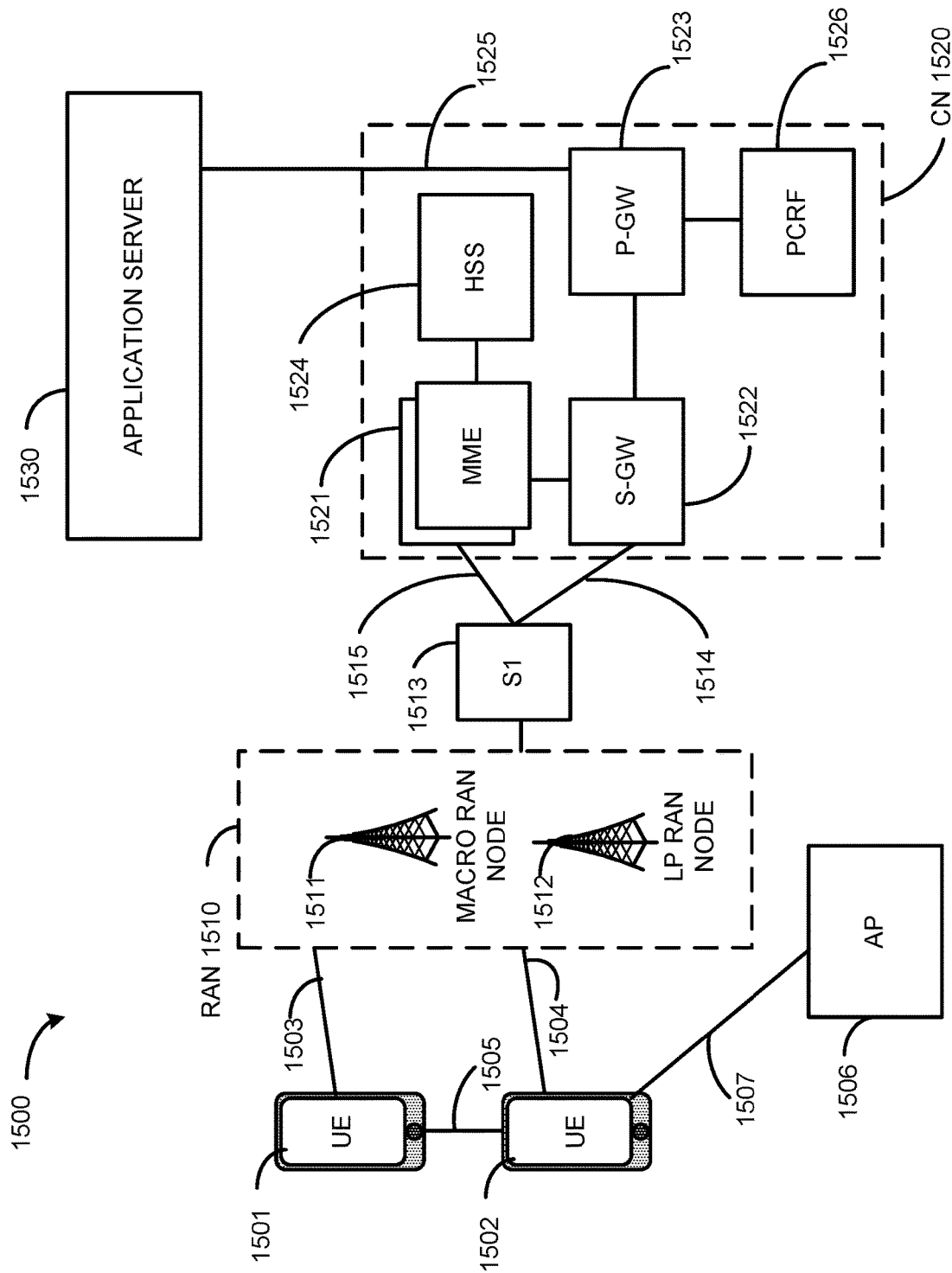
FIG. 15 illustrates architecture of a system of a network, in accordance with some embodiments.

FIG. 15 illustrates architecture of a system 1500 of a network, in accordance with some embodiments. The system 1500 is shown to include a user equipment (UE) 1501 and a UE 1502. The UEs 1501 and 1502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1501 and 1502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1501 and 1502 may be configured to connect, e.g., communicatively couple, with a radio access network (RAN) 1510—the RAN 1510 may be, for example, an Evolved Universal Mobile Telecommunications System (UMTS) Terrestrial Radio Access Network (E-UTRAN), a NextGen RAN (NG RAN), or some other type of RAN. The UEs 1501 and 1502 utilize connections 1503 and 1504, respectively, each of which comprises a physical communications interface or layer (discussed in further detail below); in this example, the connections 1503 and 1504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1501 and 1502 may further directly exchange communication data via a ProSe interface 1505. The ProSe interface 1505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1502 is shown to be configured to access an access point (AP) 1506 via connection 1507. The connection 1507 can comprise a local wireless connection, such as a connection consistent with any IEEE 802.11 protocol, wherein the AP 1506 would comprise a wireless fidelity (WiFi®) router. In this example, the AP 1506 is shown to be connected to the Internet without connecting to the core network of the wireless system (described in further detail below).

The RAN 1510 can include one or more access nodes that enable the connections 1503 and 1504. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 1510 may include one or more RAN nodes for providing macrocells, e.g., macro RAN node 1511, and one or more RAN nodes for providing femtocells or picocells (e.g., cells having smaller coverage areas, smaller user capacity, or higher bandwidth compared to macrocells), e.g., low power (LP) RAN node 1512.

Any of the RAN nodes 1511 and 1512 can terminate the air interface protocol and can be the first point of contact for the UEs 1501 and 1502. In some embodiments, any of the RAN nodes 1511 and 1512 can fulfill various logical functions for the RAN 1510 including, but not limited to, radio network controller (RNC) functions such as radio bearer management, uplink and downlink dynamic radio resource management and data packet scheduling, and mobility management.

In accordance with some embodiments, the UEs 1501 and 1502 can be configured to communicate using Orthogonal Frequency-Division Multiplexing (OFDM) communication signals with each other or with any of the RAN nodes 1511 and 1512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1511 and 1512 to the UEs 1501 and 1502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1501 and 1502. The physical downlink control channel (PDCCH) may carry information about the transport format and resource allocations related to the PDSCH channel, among other things. It may also inform the UEs 1501 and 1502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1511 and 1512 based on channel quality information fed back from any of the UEs 1501 and 1502. The downlink resource assignment information may be sent on the PDCCH used for (e.g., assigned to) each of the UEs 1501 and 1502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1510 is shown to be communicatively coupled to a core network (CN) 1520—via an S1 interface 1513. In embodiments, the CN 1520 may be an evolved packet core (EPC) network, a NextGen Packet Core (NPC) network, or some other type of CN. In this embodiment the S1 interface 1513 is split into two parts: the S1-U interface 1514, which carries traffic data between the RAN nodes 1511 and 1512 and the serving gateway (S-GW) 1522, and the S1-mobility management entity (MME) interface 1515, which is a signaling interface between the RAN nodes 1511 and 1512 and MMEs 1521.

In this embodiment, the CN 1520 comprises the MMEs 1521, the S-GW 1522, the Packet Data Network (PDN) Gateway (P-GW) 1523, and a home subscriber server (HSS) 1524. The MMEs 1521 may be similar in function to the control plane of legacy Serving General Packet Radio Service (GPRS) Support Nodes (SGSN). The MMEs 1521 may manage mobility aspects in access such as gateway selection and tracking area list management. The HSS 1524 may comprise a database for network users, including subscription-related information to support the network entities' handling of communication sessions. The CN 1520 may comprise one or several HSSs 1524, depending on the number of mobile subscribers, on the capacity of the equipment, on the organization of the network, etc. For example, the HSS 1524 can provide support for routing/roaming, authentication, authorization, naming/addressing resolution, location dependencies, etc.

The S-GW 1522 may terminate the S1 interface 1513 towards the RAN 1510, and routes data packets between the RAN 1510 and the CN 1520. In addition, the S-GW 1522 may be a local mobility anchor point for inter-RAN node handovers and also may provide an anchor for inter-3GPP mobility. Other responsibilities may include lawful intercept, charging, and some policy enforcement.

The P-GW 1523 may terminate an SGi interface toward a PDN. The P-GW 1523 may route data packets between the EPC network 1523 and external networks such as a network including the application server 1530 (alternatively referred to as application function (AF)) via an Internet Protocol (IP) interface 1525. Generally, the application server 1530 may be an element offering applications that use IP bearer resources with the core network (e.g., UMTS Packet Services (PS) domain, LTE PS data services, etc.). In this embodiment, the P-GW 1523 is shown to be communicatively coupled to an application server 1530 via an IP communications interface 1525. The application server 1530 can also be configured to support one or more communication services (e.g., Voice-over-Internet Protocol (VoIP) sessions, PTT sessions, group communication sessions, social networking services, etc.) for the UEs 1501 and 1502 via the CN 1520.

The P-GW 1523 may further be a node for policy enforcement and charging data collection. Policy and Charging Enforcement Function (PCRF) 1526 is the policy and charging control element of the CN 1520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1526 may be communicatively coupled to the application server 1530 via the P-GW 1523. The application server 1530 may signal the PCRF 1526 to indicate a new service flow and select the appropriate Quality of Service (QoS) and charging parameters. The PCRF 1526 may provision this rule into a Policy and Charging Enforcement Function (PCEF) (not shown) with the appropriate traffic flow template (TFT) and QoS class of identifier (QCI), which commences the QoS and charging as specified by the application server 1530.

Figure 16:
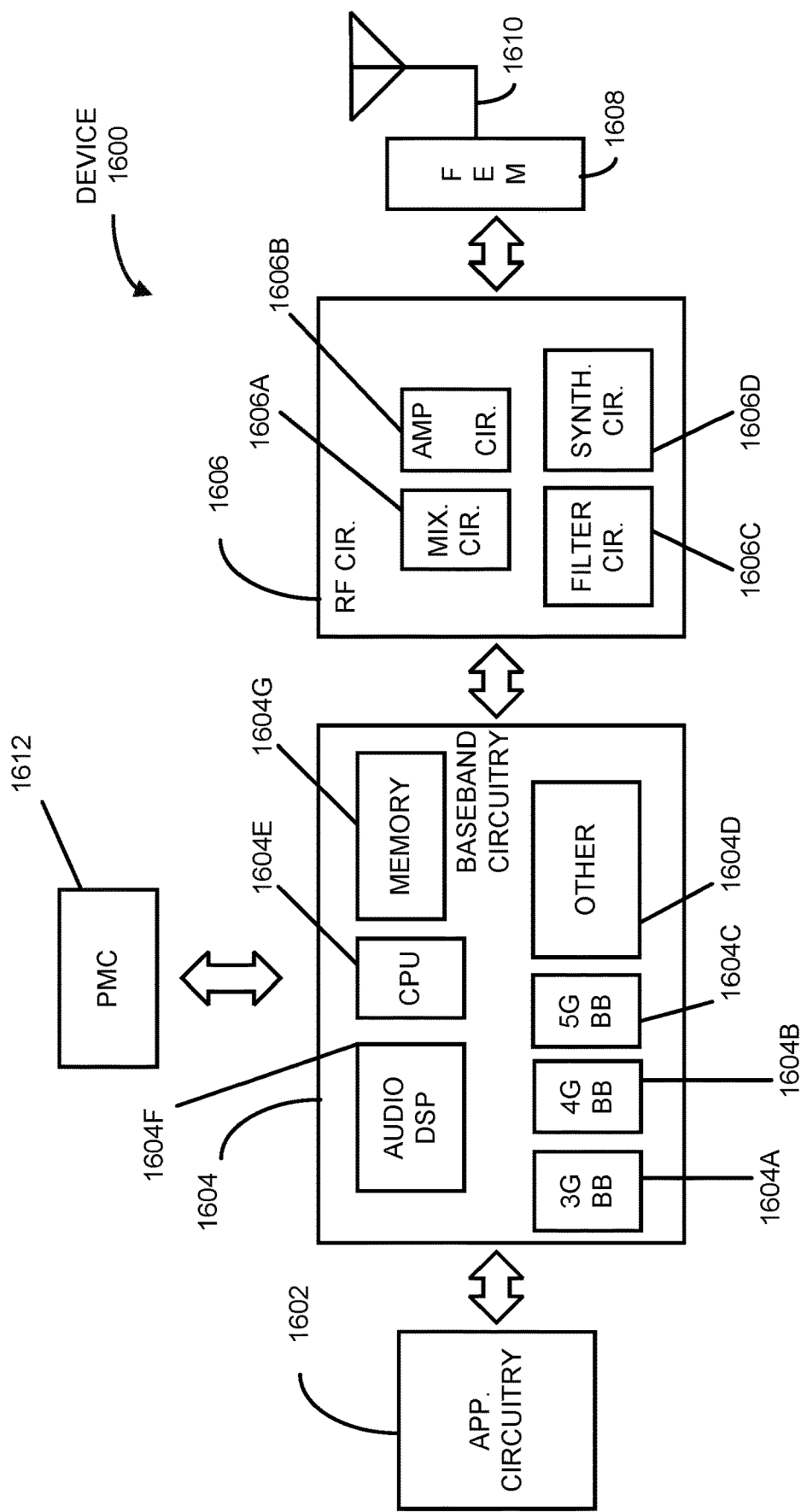
FIG. 16 illustrates example components of a device, in accordance with some embodiments.

FIG. 16 illustrates example components of a device 1600, in accordance with some embodiments. In some embodiments, the device 1600 may include application circuitry 1602, baseband circuitry 1604, Radio Frequency (RF) circuitry 1606, front-end module (FEM) circuitry 1608, one or more antennas 1610, and power management circuitry (PMC) 1612 coupled together at least as shown. The components of the illustrated device 1600 may be included in a UE or a RAN node. In some embodiments, the device 1600 may include less elements (e.g., a RAN node may not utilize application circuitry 1602, and instead include a processor/controller to process IP data received from an EPC). In some embodiments, the device 1600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1600. In some embodiments, processors of application circuitry 1602 may process IP data packets received from an EPC.

The baseband circuitry 1604 may include circuitry such as, but not limited to, one or more single-core or multi-core processors. The baseband circuitry 1604 may include one or more baseband processors or control logic to process baseband signals received from a receive signal path of the RF circuitry 1606 and to generate baseband signals for a transmit signal path of the RF circuitry 1606. Baseband processing circuitry 1604 may interface with the application circuitry 1602 for generation and processing of the baseband signals and for controlling operations of the RF circuitry 1606. For example, in some embodiments, the baseband circuitry 1604 may include a third generation (3G) baseband processor 1604A, a fourth generation (4G) baseband processor 1604B, a fifth generation (5G) baseband processor 1604C, or other baseband processor(s) 1604D for other existing generations, generations in development or to be developed in the future (e.g., second generation (2G), sixth generation (6G), etc.). The baseband circuitry 1604 (e.g., one or more of baseband processors 1604A-D) may handle various radio control functions that enable communication with one or more radio networks via the RF circuitry 1606. In other embodiments, some or all of the functionality of baseband processors 1604A-D may be included in modules stored in the memory 1604G and executed via a Central Processing Unit (CPU) 1604E. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, or constellation mapping/demapping functionality. In some embodiments, encoding/decoding circuitry of the baseband circuitry 1604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include one or more audio digital signal processor(s) (DSP) 1604F. The audio DSP(s) 1604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the receive signal path of the RF circuitry 1606 may include mixer circuitry 1606A, amplifier circuitry 1606B and filter circuitry 1606C. In some embodiments, the transmit signal path of the RF circuitry 1606 may include filter circuitry 1606C and mixer circuitry 1606A. RF circuitry 1606 may also include synthesizer circuitry 1606D for synthesizing a frequency for use by the mixer circuitry 1606A of the receive signal path and the transmit signal path. In some embodiments, the mixer circuitry 1606A of the receive signal path may be configured to down-convert RF signals received from the FEM circuitry 1608 based on the synthesized frequency provided by synthesizer circuitry 1606D. The amplifier circuitry 1606B may be configured to amplify the down-converted signals and the filter circuitry 1606C may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606A of the receive signal path may comprise passive mixers, although the scope of the embodiments is not limited in this respect.

In some embodiments, the mixer circuitry 1606A of the transmit signal path may be configured to up-convert input baseband signals based on the synthesized frequency provided by the synthesizer circuitry 1606D to generate RF output signals for the FEM circuitry 1608. The baseband signals may be provided by the baseband circuitry 1604 and may be filtered by filter circuitry 1606C.

In some embodiments, the mixer circuitry 1606A of the receive signal path and the mixer circuitry 1606A of the transmit signal path may include two or more mixers and may be arranged for quadrature downconversion and upconversion, respectively. In some embodiments, the mixer circuitry 1606A of the receive signal path and the mixer circuitry 1606A of the transmit signal path may include two or more mixers and may be arranged for image rejection (e.g., Hartley image rejection). In some embodiments, the mixer circuitry 1606A of the receive signal path and the mixer circuitry 1606A may be arranged for direct downconversion and direct upconversion, respectively. In some embodiments, the mixer circuitry 1606A of the receive signal path and the mixer circuitry 1606A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606D may be a fractional-N synthesizer or a fractional N/N+1 synthesizer, although the scope of the embodiments is not limited in this respect as other types of frequency synthesizers may be suitable. For example, synthesizer circuitry 1606D may be a delta-sigma synthesizer, a frequency multiplier, or a synthesizer comprising a phase-locked loop with a frequency divider.

The synthesizer circuitry 1606D may be configured to synthesize an output frequency for use by the mixer circuitry 1606A of the RF circuitry 1606 based on a frequency input and a divider control input. In some embodiments, the synthesizer circuitry 1606D may be a fractional N/N+1 synthesizer.

In some embodiments, frequency input may be provided by a voltage controlled oscillator (VCO), although that is not a requirement. Divider control input may be provided by either the baseband circuitry 1604 or the applications processor 1602 depending on the desired output frequency. In some embodiments, a divider control input (e.g., N) may be determined from a look-up table based on a channel indicated by the applications processor 1602.

Synthesizer circuitry 1606D of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610. In various embodiments, the amplification through the transmitting or receiving signal paths may be done solely in the RF circuitry 1606, solely in the FEM 1608, or in both the RF circuitry 1606 and the FEM 1608.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610).

In some embodiments, the PMC 1612 may manage power provided to the baseband circuitry 1604. In particular, the PMC 1612 may control power-source selection, voltage scaling, battery charging, or DC-to-DC conversion. The PMC 1612 may often be included when the device 1600 is capable of being powered by a battery, for example, when the device is included in a UE. The PMC 1612 may increase the power conversion efficiency while providing desirable implementation size and heat dissipation characteristics.

FIG. 16 shows the PMC 1612 coupled only with the baseband circuitry 1604. However, in other embodiments, the PMC 1612 may be additionally or alternatively coupled with, and perform similar power management operations for, other components such as, but not limited to, application circuitry 1602, RF circuitry 1606, or FEM 1608.

In some embodiments, the PMC 1612 may control, or otherwise be part of, various power saving mechanisms of the device 1600. For example, if the device 1600 is in an RRC_Connected state, where it is still connected to the RAN node as it expects to receive traffic shortly, then it may enter a state known as Discontinuous Reception Mode (DRX) after a period of inactivity. During this state, the device 1600 may power down for brief intervals of time and thus save power.

If there is no data traffic activity for an extended period of time, then the device 1600 may transition off to an RRC_Idle state, where it disconnects from the network and does not perform operations such as channel quality feedback, handover, etc. The device 1600 goes into a very low power state and it performs paging where again it periodically wakes up to listen to the network and then powers down again. The device 1600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1602 and processors of the baseband circuitry 1604 may be used to execute elements of one or more instances of a protocol stack. For example, processors of the baseband circuitry 1604, alone or in combination, may be used execute Layer 3, Layer 2, or Layer 1 functionality, while processors of the application circuitry 1604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 17:
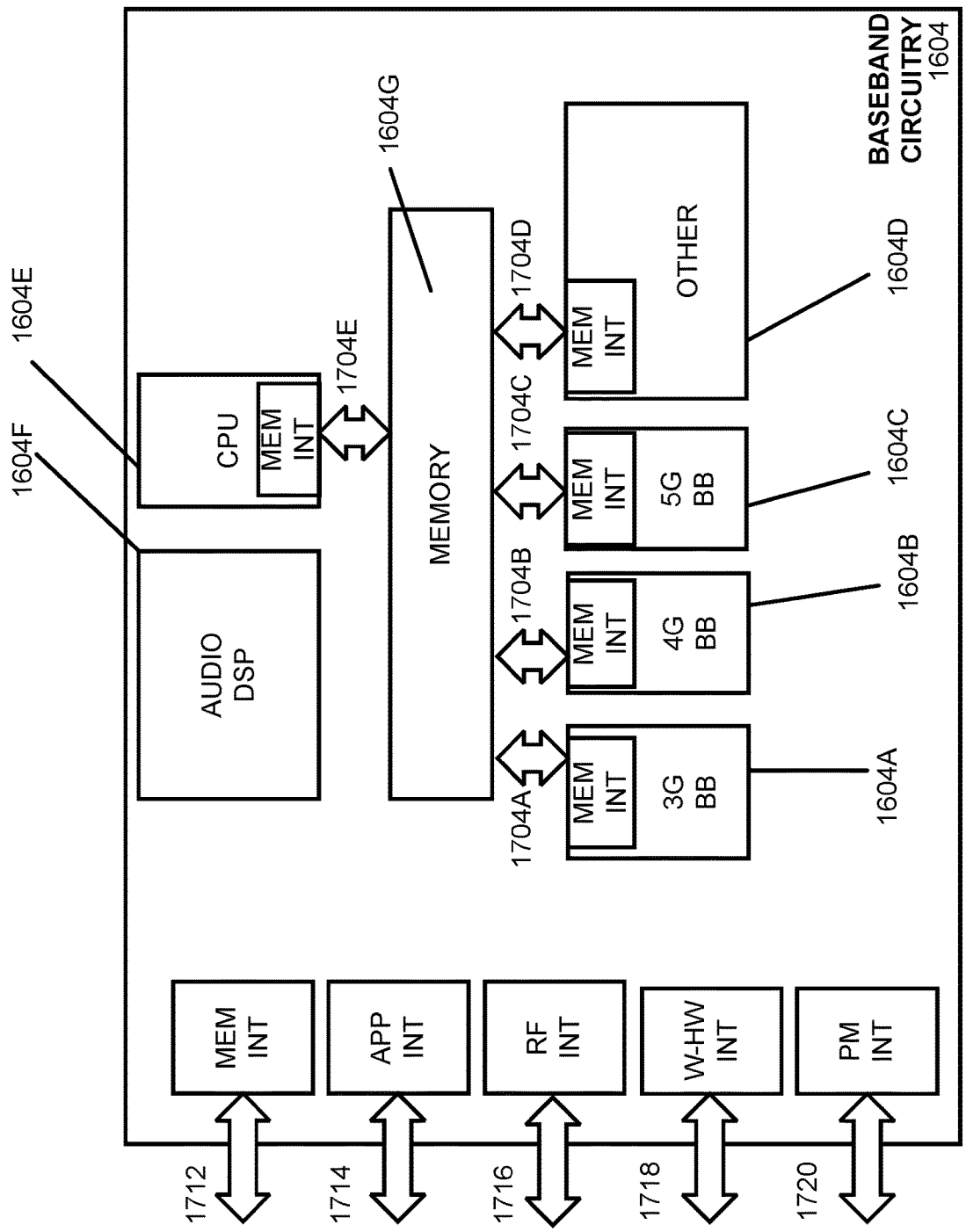
FIG. 17 illustrates example interfaces of baseband circuitry, in accordance with some embodiments.

FIG. 17 illustrates example interfaces of baseband circuitry, in accordance with some embodiments. As discussed above, the baseband circuitry 1604 of FIG. 16 may comprise processors 1604A-1604E and a memory 1604G utilized by said processors. Each of the processors 1604A-1604E may include a memory interface, 1704A-1704E, respectively, to send/receive data to/from the memory 1604G.

The baseband circuitry 1604 may further include one or more interfaces to communicatively couple to other circuitries/devices, such as a memory interface 1712 (e.g., an interface to send/receive data to/from memory external to the baseband circuitry 1604), an application circuitry interface 1714 (e.g., an interface to send/receive data to/from the application circuitry 1602 of FIG. 16), an RF circuitry interface 1716 (e.g., an interface to send/receive data to/from RF circuitry 1606 of FIG. 16), a wireless hardware connectivity interface 1718 (e.g., an interface to send/receive data to/from Near Field Communication (NFC) components, Bluetooth® components (e.g., Bluetooth® Low Energy), Wi-Fi® components, and other communication components), and a power management interface 1720 (e.g., an interface to send/receive power or control signals to/from the PMC 1612).

Figure 18:
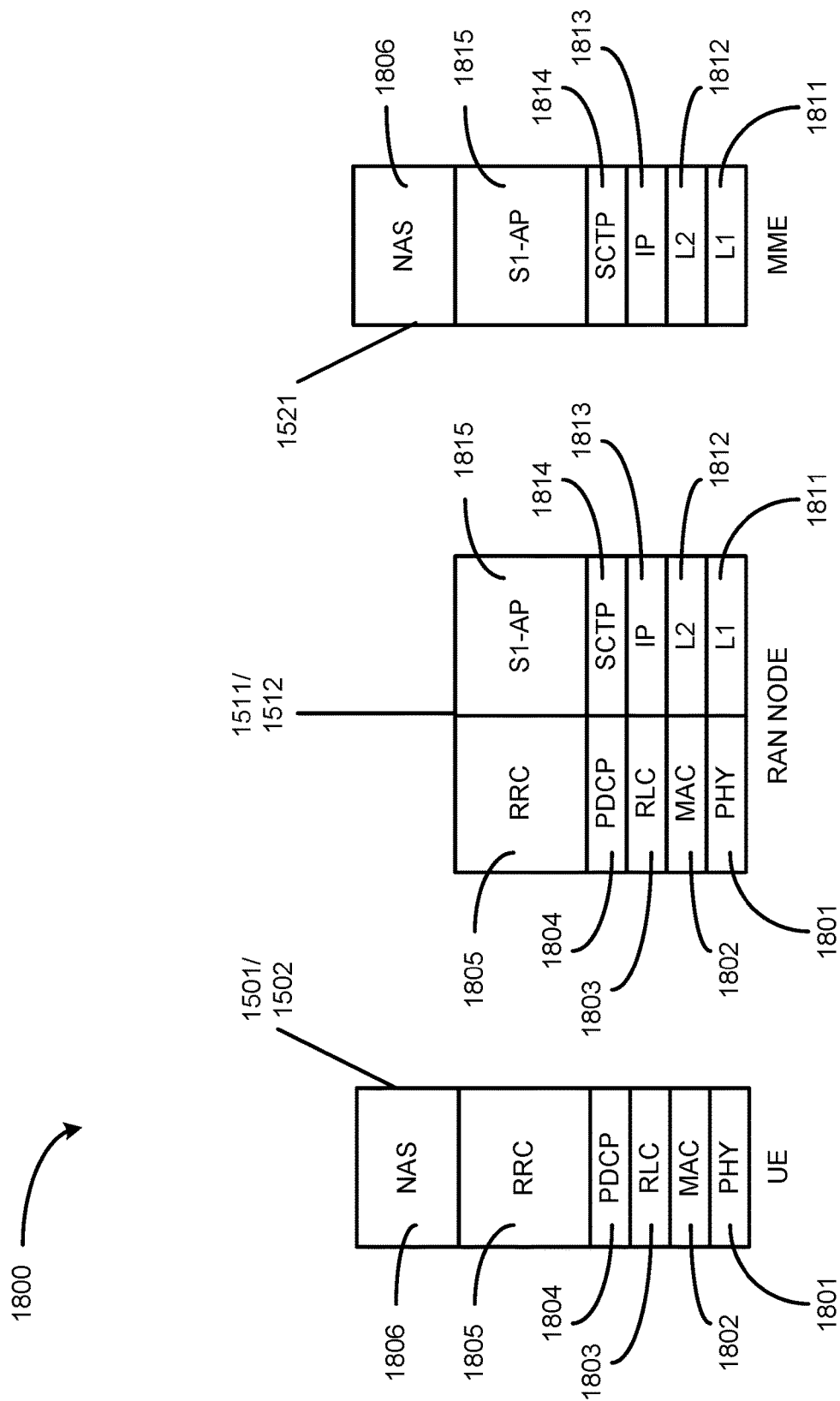
FIG. 18 is an illustration of a control plane protocol stack, in accordance with some embodiments.

FIG. 18 is an illustration of a control plane protocol stack, in accordance with some embodiments. In this embodiment, a control plane 1800 is shown as a communications protocol stack between the UE 1501 (or alternatively, the UE 1502), the RAN node 1511 (or alternatively, the RAN node 1512), and the MME 1521.

The PHY layer 1801 may transmit or receive information used by the MAC layer 1802 over one or more air interfaces. The PHY layer 1801 may further perform link adaptation or adaptive modulation and coding (AMC), power control, cell search (e.g., for initial synchronization and handover purposes), and other measurements used by higher layers, such as the RRC layer 1805. The PHY layer 1801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1803 may operate in a plurality of modes of operation, including: Transparent Mode (TM), Unacknowledged Mode (UM), and Acknowledged Mode (AM). The RLC layer 1803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1501 and the RAN node 1511 may utilize a Uu interface (e.g., an LTE-Uu interface) to exchange control plane data via a protocol stack comprising the PHY layer 1801, the MAC layer 1802, the RLC layer 1803, the PDCP layer 1804, and the RRC layer 1805.

The non-access stratum (NAS) protocols 1806 form the highest stratum of the control plane between the UE 1501 and the MME 1521. The NAS protocols 1806 support the mobility of the UE 1501 and the session management procedures to establish and maintain IP connectivity between the UE 1501 and the P-GW 1523.

The S1 Application Protocol (S1-AP) layer 1815 may support the functions of the S1 interface and comprise Elementary Procedures (EPs). An EP is a unit of interaction between the RAN node 1511 and the CN 1520. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1814 may ensure reliable delivery of signaling messages between the RAN node 1511 and the MME 1521 based, in part, on the IP protocol, supported by the IP layer 1813. The L2 layer 1812 and the L1 layer 1811 may refer to communication links (e.g., wired or wireless) used by the RAN node and the MME to exchange information.

The RAN node 1511 and the MME 1521 may utilize an S1-MME interface to exchange control plane data via a protocol stack comprising the L1 layer 1811, the L2 layer 1812, the IP layer 1813, the SCTP layer 1814, and the S1-AP layer 1815.

Figure 19:
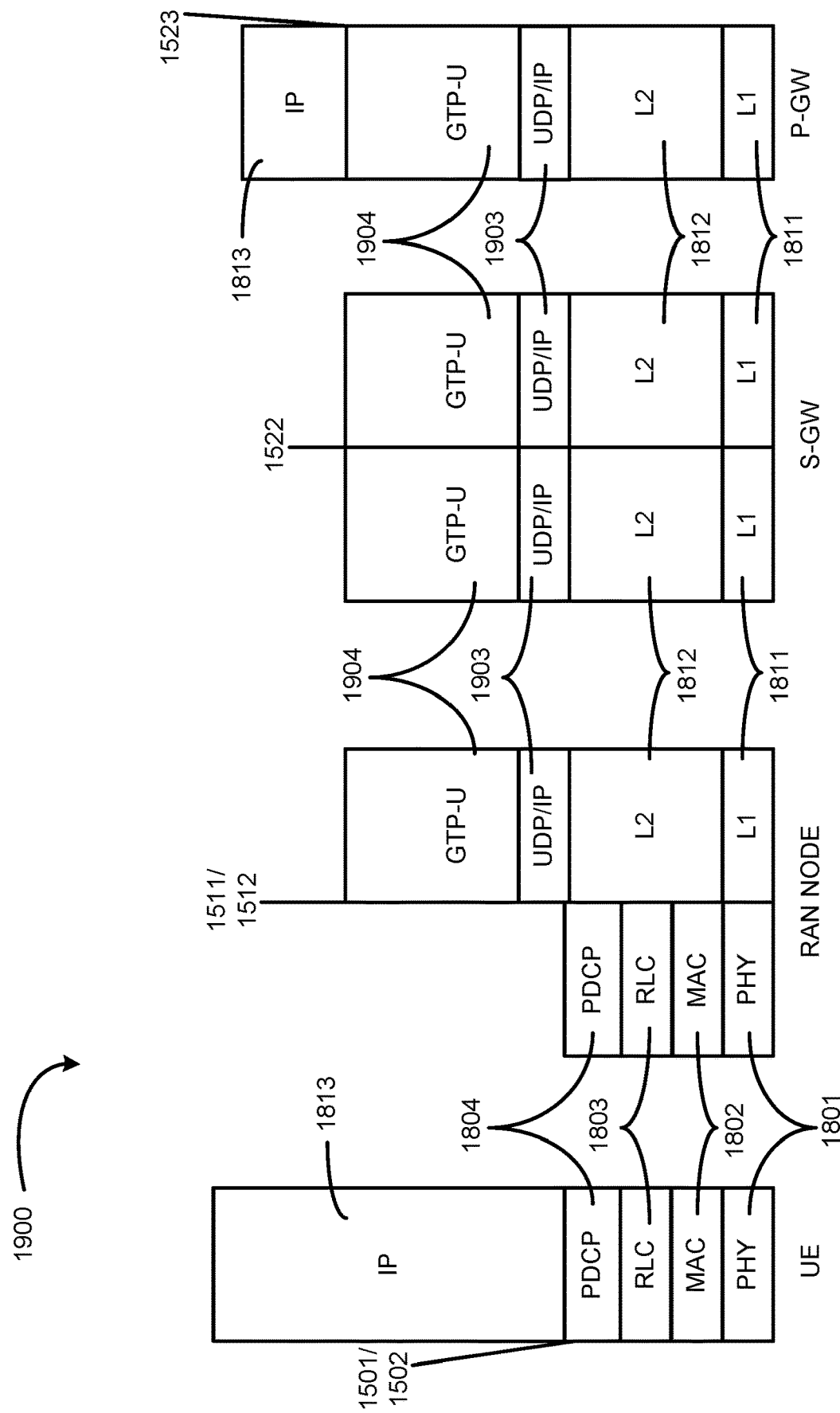
FIG. 19 is an illustration of a user plane protocol stack, in accordance with some embodiments.

FIG. 19 is an illustration of a user plane protocol stack, in accordance with some embodiments. In this embodiment, a user plane 1900 is shown as a communications protocol stack between the UE 1501 (or alternatively, the UE 1502), the RAN node 1511 (or alternatively, the RAN node 1512), the S-GW 1522, and the P-GW 1523. The user plane 1900 may utilize at least some of the same protocol layers as the control plane 1800. For example, the UE 1501 and the RAN node 1511 may utilize a Uu interface (e.g., an LTE-Uu interface) to exchange user plane data via a protocol stack comprising the PHY layer 1801, the MAC layer 1802, the RLC layer 1803, the PDCP layer 1804.

The General Packet Radio Service (GPRS) Tunneling Protocol for the user plane (GTP-U) layer 1904 may be used for carrying user data within the GPRS core network and between the radio access network and the core network. The user data transported can be packets in any of IPv4, IPv6, or PPP formats, for example. The UDP and IP security (UDP/IP) layer 1903 may provide checksums for data integrity, port numbers for addressing different functions at the source and destination, and encryption and authentication on the selected data flows. The RAN node 1511 and the S-GW 1522 may utilize an S1-U interface to exchange user plane data via a protocol stack comprising the L1 layer 1811, the L2 layer 1812, the UDP/IP layer 1903, and the GTP-U layer 1904. The S-GW 1522 and the P-GW 1523 may utilize an S5/S8a interface to exchange user plane data via a protocol stack comprising the L1 layer 1811, the L2 layer 1812, the UDP/IP layer 1903, and the GTP-U layer 1904. As discussed above with respect to FIG. 18, NAS protocols support the mobility of the UE 1501 and the session management procedures to establish and maintain IP connectivity between the UE 1501 and the P-GW 1523.

FIG. 20 is a block diagram illustrating components, according to some example embodiments, which are able to read instructions from a machine-readable or computer-readable medium (e.g., a non-transitory machine-readable storage medium) and perform any one or more of the methodologies discussed herein. Specifically, FIG. 20 shows a diagrammatic representation of hardware resources 2000 including one or more processors (or processor cores) 2010, one or more memory/storage devices 2020, and one or more communication resources 2030, each of which may be communicatively coupled via a bus 2040. For embodiments where node virtualization (e.g., NFV) is utilized, a hypervisor 2002 may be executed to provide an execution environment for one or more network slices/sub-slices to utilize the hardware resources 2000.

The processors 2010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2012 and a processor 2014.

The memory/storage devices 2020 may include main memory, disk storage, or any suitable combination thereof. The memory/storage devices 2020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2030 may include interconnection or network interface components or other suitable devices to communicate with one or more peripheral devices 2004 or one or more databases 2006 via a network 2008. For example, the communication resources 2030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2050 may comprise software, a program, an application, an applet, an app, or other executable code for causing at least any of the processors 2010 to perform any one or more of the methodologies discussed herein. The instructions 2050 may reside, completely or partially, within at least one of the processors 2010 (e.g., within the processor's cache memory), the memory/storage devices 2020, or any suitable combination thereof. Furthermore, any portion of the instructions 2050 may be transferred to the hardware resources 2000 from any combination of the peripheral devices 2004 or the databases 2006. Accordingly, the memory of processors 2010, the memory/storage devices 2020, the peripheral devices 2004, and the databases 2006 are examples of computer-readable and machine-readable media.

Examples herein may include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus for a user equipment (UE), comprising: a processor, configured to generate a uplink (UL) signal data for a physical uplink shared channel (PUSCH) by using a resource mapping scheme; and a radio frequency (RF) interface, configured to receive the generated UL signal from the processor, wherein at least a part of the resource mapping scheme is predefined, configured by higher layer signalling, or indicated in downlink control information (DCI), the higher layer signalling is a radio resource control (RRC) signalling.

Example 2 comprises the subject matter of any variation of example 1, wherein the UL signal data includes UL control information (UCI) and UL shared channel (UL-SCH), the UCI includes a hybrid automatic repeat request-acknowledge (HAQR-ACK) feedback and/or a channel state information (CSI) report, and the CSI report includes a first CSI part and a second CSI part.

Example 3 comprises the subject matter of any variation of example 2, wherein the processor is configured to apply separate encoding and resource mapping procedures to the transmission of the HARQ-ACK feedback, the first CSI part, and/or the second CSI part.

Example 4 comprises the subject matter of any variation of example 2 or 3, wherein one or more resource regions are allocated to the transmission of the HARQ-ACK feedback, the first CSI part, and/or the second CSI part according to the configuration by higher layer signalling.

Example 5 comprises the subject matter of any variation of example 4, wherein for each resource region, the processor is configured to apply the same resource mapping manner to the transmission of the HARQ-ACK feedback, the first CSI part and the second CSI part, wherein the resource mapping manner is time first mapping or frequency first mapping.

Example 6 comprises the subject matter of any variation of example 5, wherein for the frequency first mapping, the resource mapping starts from the first or last subcarrier of the allocated resource.

Example 7 comprises the subject matter of any variation of example 5 or 6, wherein for the time first mapping, the resource mapping starts from the first or last symbol of the allocated resource.

Example 8 comprises the subject matter of any variation of any one of examples 4-7, wherein for each resource region, the HARQ-ACK feedback, the first CSI part, the second CSI part, and the UL-SCH is mapped in the following order: the HARQ-ACK feedback, the first CSI part, the second CSI part, and the UL-SCH.

Example 9 comprises the subject matter of any variation of any one of examples 4-7, wherein for each resource region, the HARQ-ACK feedback, the first CSI part, the second CSI part, and the UL-SCH is mapped in the following order: the HARQ-ACK feedback, the first CSI part, the UL-SCH, the second CSI part.

Example 10 comprises the subject matter of any variation of example 8 or 9, wherein the starting position for the transmission of the HARQ-ACK feedback is K symbols after the first symbol of demodulation reference signal (DM-RS), the value K is configured by the higher layer signalling via New Radio (NR) minimum system information (MSI), NR remaining minimum system information (RMSI), NR other system information (OSI) or radio resource control (RRC) signaling, and/or dynamically indicated in the DCI.

Example 11 comprises the subject matter of any variation of example 8 or 9, wherein in the case of late DL assignment after UL grant, HARQ-ACK feedback punctures the UL data, the starting symbol for HARQ-ACK feedback puncturing is determined in accordance with the HARQ-ACK delay as indicated in the DCI for scheduling PDSCH.

Example 12 comprises the subject matter of any variation of any one of examples 8-11, wherein the starting positions for the transmission of the first CSI part and the second CSI part are predefined, and/or configured by higher layer signalling via New Radio (NR) minimum system information (MSI), NR remaining minimum system information (RMSI), NR other system information (OSI) or radio resource control (RRC) signaling.

Example 13 comprises the subject matter of any variation of any one of examples 8-11, wherein the starting positions for the transmission of the first CSI part and the second CSI part are determined in accordance with the allocated resource for the PUSCH.

Example 14 comprises the subject matter of any variation of any one of examples 8-11, wherein the first CSI part is mapped to the resource which is not allocated to the HAQR-ACK feedback.

Example 15 comprises the subject matter of any variation of any one of examples 12-14, wherein the amount of the resource allocated to the first CSI part is determined in accordance with a configured parameter and a modulation and coding scheme applied to the transmission of the first CSI part.

Example 16 comprises the subject matter of any variation of any one of examples 8-15, wherein the starting position for the transmission of UL-SCH is predefined, configured by the higher layer signalling via New Radio (NR) minimum system information (MSI), NR remaining minimum system information (RMSI), NR other system information (OSI) or radio resource control (RRC) signaling, and/or dynamically indicated in the DCI.

Example 17 comprises the subject matter of any variation of any one of examples 8-15, wherein the starting position for the transmission of UL-SCH is determined in accordance with the maximum payload size or beta offset parameter for the first and second CSI part.

Example 18 comprises the subject matter of any variation of any one of examples 10, 12-13, 16-17, wherein in the case of frequency first mapping, the starting position is a starting symbol, and in the case of frequency first mapping, the starting position is a starting subcarrier.

Example 19 comprises the subject matter of any variation of example 17, wherein if allocated resources for the CSI report are not fully occupied, the UL-SCH is wrapped around such that the resources, which are allocated to the CSI report but not occupied by the CSI report, are reallocated to the transmission of UL-SCH.

Example 20 comprises the subject matter of any variation of any one of examples 4-19, wherein the starting position of each resource region is predefined, and/or configured by higher layer signalling via New Radio (NR) minimum system information (MSI), NR remaining minimum system information (RMSI), NR other system information (OSI) or radio resource control (RRC) signaling.

Example 21 comprises the subject matter of any variation of any one of examples 4-19, wherein the starting position of each resource region is determined in accordance with the allocated resource for the PUSCH.

Example 22 comprises the subject matter of any variation of example 20 or 21, wherein two resource regions are allocated to the transmission of the first and second CSI part, wherein the first resource region starts from the first symbol after the first Demodulation reference signal (DM-RS) and the second resource region starts from the middle of the allocated PUSCH duration in time domain and/or the middle of subcarrier or PRB of the allocated PUSCH resource in frequency domain.

Example 23 comprises the subject matter of any variation of example 22, wherein the second resource region starts from the first symbol after the second DM-RS.

Example 24 comprises the subject matter of any variation of any one of examples 4-23, wherein when frequency hopping is enabled for the transmission of PUSCH, the allocated resources for the transmission of the HARQ-ACK feedback, the first CSI part, and/or the second CSI part are substantially equally divided into two portions, and each portion is transmitted in each frequency hop, the frequency first mapping is applied to the transmission of PUSCH in each frequency hop.

Example 25 comprises the subject matter of any variation of example 5, wherein whether to employ time first mapping or frequency first mapping is configured by a layer higher than the encoding via New Radio (NR) minimum system information (MSI), NR remaining minimum system information (RMSI), NR other system information (OSI) or radio resource control (RRC) signaling, and/or dynamically indicated in the DCI.

Example 26 comprises the subject matter of any variation of example 2, wherein the HARQ is punctured or rate-matched around the CSI report.

Example 27 comprises the subject matter of any variation of example 26, wherein in the case when payload size of the HARQ-ACK feedback is larger than 2 bits, a joint coding is applied to the HARQ-ACK feedback and the first CSI part.

Example 28 comprises the subject matter of any variation of example 27, wherein an additional encoding procedure is applied to the HARQ-ACK feedback, prior to joint coding with the first CSI part.

Example 29 comprises the subject matter of any variation of example 5, wherein the processor is configured to apply the same resource mapping manner as the first CSI part and the second CSI part to the UL-SCH.

Example 30 comprises the subject matter of any variation of example 2 or 3, wherein the processor is configured to map the UCI to the resource around a phase tracking reference signal (PT-RS) with priority order of the HARQ-ACK feedback, the first CSI part and the second CSI part, the UCI with higher priority is mapped to the resource closer to the PT-RS.

Example 31 is a method for operating a user equipment (UE), comprising: generating a uplink (UL) signal to be transmitted on physical uplink shared channel (PUSCH) by using a resource mapping scheme; and transmitting the generated UL signal, wherein at least a part of the resource mapping scheme is predefined, configured by higher layer signalling, or indicated in downlink control information (DCI), the higher layer signalling is a radio resource control (RRC) signalling.

Example 32 comprises the subject matter of any variation of example 31, wherein the UL signal includes UL control information (UCI) and UL shared channel (UL-SCH), the UCI includes a hybrid automatic repeat request-acknowledge (HAQR-ACK) feedback and/or a channel state information (CSI) report, and the CSI report includes a first CSI part and a second CSI part.

Example 33 comprises the subject matter of any variation of example 32, wherein separate encoding and resource mapping procedures are applied to the transmission of the HARQ-ACK feedback, the first CSI part, and/or the second CSI part.

Example 34 comprises the subject matter of any variation of example 32 or 33, wherein one or more resource regions are allocated to the transmission of the HARQ-ACK feedback, the first CSI part, and/or the second CSI part according to the configuration by higher layer signalling.

Example 35 comprises the subject matter of any variation of example 34, wherein for each resource region, the same resource mapping manner is applied to the transmission of the HARQ-ACK feedback, the first CSI part and the second CSI part, wherein the resource mapping manner is time first mapping or frequency first mapping.

Example 36 comprises the subject matter of any variation of example 35, wherein for the frequency first mapping, the resource mapping starts from the first or last subcarrier of the allocated resource.

Example 37 comprises the subject matter of any variation of example 35 or 36, wherein for the time first mapping, the resource mapping starts from the first or last symbol of the allocated resource.

Example 38 comprises the subject matter of any variation of any one of examples 34-37, wherein for each resource region, the HARQ-ACK feedback, the first CSI part, the second CSI part, and the UL-SCH is mapped in the following order: the HARQ-ACK feedback, the first CSI part, the second CSI part, and the UL-SCH.

Example 39 comprises the subject matter of any variation of any one of examples 34-37, wherein for each resource region, the HARQ-ACK feedback, the first CSI part, the second CSI part, and the UL-SCH is mapped in the following order: the HARQ-ACK feedback, the first CSI part, the UL-SCH, the second CSI part.

Example 40 comprises the subject matter of any variation of example 38 or 39, wherein the starting position for the transmission of the HARQ-ACK feedback is K symbols after the first symbol of demodulation reference signal (DM-RS), the value K is configured by the higher layer signalling via New Radio (NR) minimum system information (MSI), NR remaining minimum system information (RMSI), NR other system information (OSI) or radio resource control (RRC) signaling, and/or dynamically indicated in the DCI.

Example 41 comprises the subject matter of any variation of example 38 or 39, wherein in the case of late DL assignment after UL grant, HARQ-ACK feedback punctures the UL data, the starting symbol for HARQ-ACK feedback puncturing is determined in accordance with the HARQ-ACK delay as indicated in the DCI for scheduling PDSCH.

Example 42 comprises the subject matter of any variation of any one of examples 38-41, wherein the starting positions for the transmission of the first CSI part and the second CSI part are predefined, and/or configured by higher layer signalling via New Radio (NR) minimum system information (MSI), NR remaining minimum system information (RMSI), NR other system information (OSI) or radio resource control (RRC) signaling.

Example 43 comprises the subject matter of any variation of any one of examples 38-41, wherein the starting positions for the transmission of the first CSI part and the second CSI part are determined in accordance with the allocated resource for the PUSCH.

Example 44 comprises the subject matter of any variation of any one of examples 38-41, wherein the first CSI part is mapped to the resource which is not allocated to the HAQR-ACK feedback.

Example 45 comprises the subject matter of any variation of any one of examples 42-44, wherein the amount of the resource allocated to the first CSI part is determined in accordance with a configured parameter and a modulation and coding scheme applied to the transmission of the first CSI part.

Example 46 comprises the subject matter of any variation of any one of examples 38-45, wherein the starting position for the transmission of UL-SCH is predefined, configured by the higher layer signalling via New Radio (NR) minimum system information (MSI), NR remaining minimum system information (RMSI), NR other system information (OSI) or radio resource control (RRC) signaling, and/or dynamically indicated in the DCI.

Example 47 comprises the subject matter of any variation of any one of examples 38-45, wherein the starting position for the transmission of UL-SCH is determined in accordance with the maximum payload size or beta offset parameter for the first and second CSI part.

Example 48 comprises the subject matter of any variation of any one of examples 40, 42-43, 46-47, wherein in the case of frequency first mapping, the starting position is a starting symbol, and in the case of frequency first mapping, the starting position is a starting subcarrier.

Example 49 comprises the subject matter of any variation of example 47, wherein if allocated resources for the CSI report are not fully occupied, the UL-SCH is wrapped around such that the resources, which are allocated to the CSI report but not occupied by the CSI report, are re-allocated to the transmission of UL-SCH.

Example 50 comprises the subject matter of any variation of any one of examples 34-49, wherein the starting position of each resource region is predefined, and/or configured by higher layer signalling via New Radio (NR) minimum system information (MSI), NR remaining minimum system information (RMSI), NR other system information (OSI) or radio resource control (RRC) signaling.

Example 51 comprises the subject matter of any variation of any one of examples 34-49, wherein the starting position of each resource region is determined in accordance with the allocated resource for the PUSCH.

Example 52 comprises the subject matter of any variation of example 50 or 51, wherein two resource regions are allocated to the transmission of the first and second CSI part, wherein the first resource region starts from the first symbol after the first Demodulation reference signal (DM-RS) and the second resource region starts from the middle of the allocated PUSCH duration in time domain and/or the middle of subcarrier or PRB of the allocated PUSCH resource in frequency domain.

Example 53 comprises the subject matter of any variation of example 52, wherein the second resource region starts from the first symbol after the second DM-RS.

Example 54 comprises the subject matter of any variation of any one of examples 34-53, wherein when frequency hopping is enabled for the transmission of PUSCH, the allocated resources for the transmission of the HARQ-ACK feedback, the first CSI part, and/or the second CSI part are substantially equally divided into two portions, and each portion is transmitted in each frequency hop, the frequency first mapping is applied to the transmission of PUSCH in each frequency hop.

Example 55 comprises the subject matter of any variation of example 35, wherein whether to employ time first mapping or frequency first mapping is configured by a layer higher than the encoding via New Radio (NR) minimum system information (MSI), NR remaining minimum system information (RMSI), NR other system information (OSI) or radio resource control (RRC) signaling, and/or dynamically indicated in the DCI.

Example 56 comprises the subject matter of any variation of example 32, wherein the HARQ is punctured or rate-matched around the CSI report.

Example 57 comprises the subject matter of any variation of example 56, wherein in the case when payload size of the HARQ-ACK feedback is larger than 2 bits, a joint coding is applied to the HARQ-ACK feedback and the first CSI part.

Example 58 comprises the subject matter of any variation of example 57, wherein an additional encoding procedure is applied to the HARQ-ACK feedback, prior to joint coding with the first CSI part.

Example 59 comprises the subject matter of any variation of example 35, wherein the same resource mapping manner as the first CSI part and the second CSI part is applied to the UL-SCH.

Example 60 comprises the subject matter of any variation of example 32 or 33, wherein the UCI is mapped to the resource around a phase tracking reference signal (PT-RS) with priority order of the HARQ-ACK feedback, the first CSI part and the second CSI part, the UCI with higher priority is mapped to the resource closer to the PT-RS.

Example 61 is an apparatus for a network node, comprising: a processor, configured to encode a downlink control information (DCI); and a radio frequency (RF) interface, configured to receive the encoded DCI from the processor, wherein the DCI indicates a resource mapping scheme, for generating a uplink (UL) signal data of a physical uplink shared channel (PUSCH).

Example 62 comprises the subject matter of any variation of example 61, wherein the UL signal data includes UL control information (UCI) and UL shared channel (UL-SCH), the UCI includes a hybrid automatic repeat request-acknowledge (HAQR-ACK) feedback and/or a channel state information (CSI) report, and the CSI report includes a first CSI part and a second CSI part.

Example 63 comprises the subject matter of any variation of example 62, wherein the same resource mapping manner is applied to the transmission of the HARQ-ACK feedback, the first CSI part and the second CSI part, wherein the resource mapping manner is time first mapping or frequency first mapping according to the DCI.

Example 64 comprises the subject matter of any variation of example 62 or 63, wherein the starting position for the transmission of UL-SCH is indicated in the DCI, in the case of frequency first mapping, the starting position is a starting symbol, and in the case of frequency first mapping, the starting position is a starting subcarrier.

Example 65 comprises the subject matter of any variation of any one of examples 62-64, wherein separate encoding and resource mapping procedures are applied to the transmission of the HARQ-ACK feedback, the first CSI part, and the second CSI part.

Example 66 comprises the subject matter of any variation of any one of examples 62-65, wherein one or more resource regions are allocated to the transmission of the HARQ-ACK feedback, the first CSI part, and/or the second CSI part according to the configuration by higher layer signalling.

Example 67 comprises the subject matter of any variation of example 66, wherein when frequency hopping is enabled for the transmission of PUSCH, the allocated resources for the transmission of the HARQ-ACK feedback, the first CSI part, and/or the second CSI part are substantially equally divided into two portions, and each portion is transmitted in each frequency hop, the frequency first mapping is applied to the transmission of PUSCH in each frequency hop.

Example 68 is a method for operating a network node, comprising: encoding a downlink control information (DCI); and transmitting the encoded DCI, wherein the DCI indicates a resource mapping scheme, which will be used for generating a uplink (UL) signal to be transmitted on physical uplink shared channel (PUSCH).

Example 69 comprises the subject matter of any variation of example 68, wherein the UL signal includes UL control information (UCI) and UL shared channel (UL-SCH), the UCI includes a hybrid automatic repeat request-acknowledge (HAQR-ACK) feedback and/or a channel state information (CSI) report, and the CSI report includes a first CSI part and a second CSI part.

Example 70 comprises the subject matter of any variation of example 69, wherein the same resource mapping manner is applied to the transmission of the HARQ-ACK feedback, the first CSI part and the second CSI part, wherein the resource mapping manner is time first mapping or frequency first mapping according to the DCI.

Example 71 comprises the subject matter of any variation of example 69 or 70, wherein the starting position for the transmission of UL-SCH is indicated in the DCI, in the case of frequency first mapping, the starting position is a starting symbol, and in the case of frequency first mapping, the starting position is a starting subcarrier.

Example 72 comprises the subject matter of any variation of any one of examples 69-71, wherein separate encoding and resource mapping procedures are applied to the transmission of the HARQ-ACK feedback, the first CSI part, and the second CSI part.

Example 73 comprises the subject matter of any variation of any one of examples 69-72, wherein one or more resource regions are allocated to the transmission of the HARQ-ACK feedback, the first CSI part, and/or the second CSI part according to the configuration by higher layer signalling.

Example 74 comprises the subject matter of any variation of example 73, wherein when frequency hopping is enabled for the transmission of PUSCH, the allocated resources for the transmission of the HARQ-ACK feedback, the first CSI part, and/or the second CSI part are substantially equally divided into two portions, and each portion is transmitted in each frequency hop, the frequency first mapping is applied to the transmission of PUSCH in each frequency hop.

Example 75 is a computer readable medium comprising computer readable code, which when run on an apparatus, causes the apparatus to perform the method according to any one of examples 31-60 and examples 68-74.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art may recognize.

In this regard, while the disclosed subject matter has been described in connection with various embodiments and corresponding Figures, where applicable, it is to be understood that other similar embodiments may be used or modifications and additions may be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus for a user equipment (UE), comprising a processor, configured to:
    generate uplink (UL) signal data for a physical uplink shared channel (PUSCH) by using a resource mapping scheme,
    wherein the UL signal data includes UL control information (UCI), wherein the UCI includes hybrid automatic repeat request-acknowledge (HARQ-ACK) feedback and a channel state information (CSI) report, and the CSI report includes a first CSI part and a second CSI part;
    wherein one or more resource regions are allocated to a transmission of the HARQ-ACK feedback, the first CSI part, and the second CSI part according to configuration by higher layer signalling;
    wherein for each resource region, the processor is configured to apply a frequency first resource mapping manner to a transmission of the HARQ-ACK feedback, the first CSI part, and the second CSI part, wherein the HARQ-ACK feedback, the first CSI part, and the second CSI part are mapped to adjacent frequency resources within consecutive symbols; and
    wherein at least a part of the resource mapping scheme is predefined, configured by higher layer signalling, or indicated in downlink control information (DCI).

2. The apparatus of claim 1, wherein the processor is configured to apply separate encoding and resource mapping procedures to transmission of the HARQ-ACK feedback, the first CSI part, and the second CSI part,
    wherein a payload size of the HARQ-ACK feedback is larger than 2 bits.

3. The apparatus of claim 1, wherein resource mapping starts from a first or last subcarrier of the allocated one or more resource regions.

4. The apparatus of claim 1, wherein for each resource region, the HARQ-ACK feedback, the first CSI part, the second CSI part, and a UL-SCH are mapped in the following order:
    the HARQ-ACK feedback, the first CSI part, the second CSI part, and the UL-SCH, or
    the HARQ-ACK feedback, the first CSI part, the UL-SCH, the second CSI part.

5. The apparatus of claim 4, wherein
    starting positions for a transmission of the first CSI part and the second CSI part are predefined, or configured by higher layer signalling via New Radio (NR) minimum system information (MSI), NR remaining minimum system information (RMSI), NR other system information (OSI) or radio resource control (RRC) signaling, and
    a starting position is a starting subcarrier.

6. The apparatus of claim 4, wherein
    starting positions for a transmission of the first CSI part and the second CSI part are determined in accordance with the allocated one or more resource regions for the PUSCH, and
    a starting position is a starting subcarrier.

7. The apparatus of claim 4, wherein the first CSI part is mapped to a resource which is not allocated to the HARQ-ACK feedback.

8. The apparatus of claim 4, wherein an amount of the one or more resource regions allocated to the first CSI part is determined in accordance with a configured parameter and a modulation and coding scheme applied to a transmission of the first CSI part.

9. The apparatus of claim 1, wherein two resource regions are allocated to a transmission of the first and second CSI part, wherein a first resource region starts from a first symbol after a first Demodulation reference signal (DM-RS) and a second resource region starts from the middle of subcarrier or PRB of an allocated PUSCH resource in frequency domain.

10. The apparatus of claim 9, wherein the second resource region starts from a first symbol after a second DM-RS.

11. The apparatus of claim 1, wherein when frequency hopping is enabled for a transmission of PUSCH, allocated resources for a transmission of the HARQ-ACK feedback, the first CSI part, and/or the second CSI part are substantially equally divided into two portions, and each portion is transmitted in each frequency hop, and frequency first mapping is applied to the transmission of PUSCH in each frequency hop.

12. An apparatus for a network node, comprising a processor, configured to:
  encode a downlink control information (DCI); and
  wherein the DCI indicates a resource mapping scheme, for generating uplink (UL) signal data of a physical uplink shared channel (PUSCH),
  wherein the UL signal data includes UL control information (UCI), wherein the UCI includes hybrid automatic repeat request acknowledge (HARQ-ACK) feedback and or a channel state information (CSI) report, and the CSI report includes a first CSI part and a second CSI part;
  wherein one or more resource regions are allocated to a transmission of the HARQ-ACK feedback, the first CSI part, and the second CSI part according to configuration by higher layer signalling; and
  wherein for each resource region, a frequency first resource mapping manner is applied to a transmission of the HARQ-ACK feedback, the first CSI part, and the second CSI part, wherein the HARQ-ACK feedback, the first CSI part, and the second CSI part are mapped to adjacent frequency resources within consecutive symbols.

13. The apparatus of claim 12, wherein separate encoding and resource mapping procedures are applied to a transmission of the HARQ-ACK feedback, the first CSI part, and the second CSI part.

14. The apparatus of claim 12, wherein when frequency hopping is enabled for a transmission of PUSCH, the allocated one or more resource regions for the transmission of the HARQ-ACK feedback, the first CSI part, and/or the second CSI part are substantially equally divided into two portions, and each portion is transmitted in each frequency hop,
  frequency first mapping is applied to the transmission of PUSCH in each frequency hop.

15. A non-transitory computer readable medium, having stored thereon instructions, which when executed cause an apparatus for a user equipment (UE) to:
  generate uplink (UL) signal data to be transmitted on physical uplink shared channel (PUSCH) by using a resource mapping scheme;
  wherein the UL signal data includes UL control information (UCI), wherein the UCI includes hybrid automatic repeat request-acknowledge (HARQ-ACK) feedback and a channel state information (CSI) report, and the CSI report includes a first CSI part and a second CSI part;
  wherein one or more resource regions are allocated to a transmission of the HARQ-ACK feedback, the first CSI part, and the second CSI part according to configuration by higher layer signalling;
  wherein for each resource region, a frequency first resource mapping manner is applied to a transmission of the HARQ-ACK feedback, the first CSI part, and the second CSI part, wherein the HARQ-ACK feedback, the first CSI part, and the second CSI part are mapped to adjacent frequency resources within consecutive symbols; and
  transmit the generated UL signal,
  wherein at least a part of the resource mapping scheme is predefined, configured by higher layer signalling, or indicated in downlink control information (DCI).

16. The non-transitory computer readable medium of claim 15, wherein separate encoding and resource mapping procedures are applied to a transmission of the HARQ-ACK feedback, the first CSI part, and the second CSI part,
  wherein a payload size of the HARQ-ACK feedback is larger than 2 bits.

17. The non-transitory computer readable medium of claim 15, wherein when frequency hopping is enabled for a transmission of PUSCH, allocated resources for a transmission of the HARQ-ACK feedback, the first CSI part, and/or the second CSI part are substantially equally divided into two portions, and each portion is transmitted in each frequency hop, and frequency first mapping is applied to the transmission of PUSCH in each frequency hop.

* * * * *